(12) United States Patent
Rogers et al.

(10) Patent No.: US 8,789,423 B2
(45) Date of Patent: Jul. 29, 2014

(54) HIGH FREQUENCY VIBRATION SYSTEM

(75) Inventors: James P. Rogers, Redondo Beach, CA (US); Abbas Mandvi, Brea, CA (US); Chi Chin Lee, Riverside, CA (US); Chhour M. Thong, Buena Park, CA (US); Anthony Charles Buono, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 229 days.

(21) Appl. No.: 13/287,784

(22) Filed: Nov. 2, 2011

(65) Prior Publication Data
US 2013/0104662 A1 May 2, 2013

(51) Int. Cl.
*G01M 7/02* (2006.01)

(52) U.S. Cl.
USPC .............................................. 73/663; 73/662

(58) Field of Classification Search
USPC ................... 73/663, 760, 777, 662; 310/338
See application file for complete search history.

(56) References Cited

U.S. PATENT DOCUMENTS

| | | | |
|---|---|---|---|
| 5,166,908 A * | 11/1992 | Montgomery | ............... 367/165 |
| 5,645,260 A | 7/1997 | Falangas | |
| 5,734,246 A | 3/1998 | Falangas | |

* cited by examiner

*Primary Examiner* — J M Saint Surin
(74) *Attorney, Agent, or Firm* — Yee & Associates, P.C.

(57) ABSTRACT

A method and apparatus for testing an object. A testing unit comprises a base structure, a contact structure, and piezoelectric transducers. The piezoelectric transducers are located between the base structure and the contact structure. A preload is present on the piezoelectric transducers.

16 Claims, 19 Drawing Sheets

HIGH FREQUENCY VIBRATION SYSTEM

GOVERNMENT LICENSE RIGHTS

This application was made with United States Government support under contract number HQ0006-C-0001 awarded by the Missile Defense Agency. The United States Government has certain rights in this application.

BACKGROUND INFORMATION

1. Field

The present disclosure relates generally to testing objects and, in particular, to vibration testing of objects.

2. Background

Vibrations are mechanical oscillations that may occur in different objects. Different objects react differently to vibrations. Additionally, objects also may react differently to vibrations of different intensities and different frequencies.

Vibration testing may be performed by introducing vibrations into a structure with a vibration generation device. The vibration generation device often takes the form of a shaker. The object under test may be attached to the shaker. The device under test may be connected to the shaker or placed on the shaker depending on the particular type of testing.

With relatively low frequency vibrations, a servo-hydraulic or electro-hydraulic shaker may be used. For higher frequencies, electro-dynamic shakers may be implemented.

The types of vibration tests may be a random test, a sine test, or some other type of test. With a random test, multiple intensities and frequencies may be tested. With a sine test, one frequency may be tested at a time. The object under test may be monitored during testing, after testing, or both, to identify the response of the object under test. In particular, the structural response of the object under test is often of interest.

With vehicles, a random test may be performed. A random test may use multiple intensities and frequencies at the same time. A random test may be performed to more closely replicate a real world environment. For example, with an automobile, the test may closely replicate the vibrations encountered on a road. When the object under test is a device for a spacecraft, the vibrations may simulate those encountered when the device is on a launch vehicle.

When objects are carried on launch vehicles, rockets, missiles, or other vehicles with rocket energies, vibration energies may be encountered as a result of combustion of energetic materials from a spacecraft propulsion system or as a result of various aerodynamic events. The high frequency vibration energy can be detrimental to objects that have sensitive electronics or optical components. These types of components may be present in objects such as guidance and navigational systems onboard a spacecraft. When these objects do not perform as desired, costly mission failures may occur.

As a result, when testing objects that may be placed on launch vehicles, rockets, missiles, or other similar vehicles, ultra-high vibration testing may be desired. Ultra-high vibration testing may use vibrations from about 10,000 Hz to about 100,000 Hz.

Conventional vibration testing systems, such as electro-dynamic shakers, have been used to simulate these events. These types of vibration testing systems have frequency limitations and cannot accurately duplicate the high frequency vibration environments. The limitations of currently used vibration testing systems can result in negative schedule impact and costly launch delays of satellites and other payloads.

Therefore, it would be advantageous to have a method and apparatus that takes into account at least some of the issues discussed above, as well as possibly other issues.

SUMMARY

In one advantageous embodiment, an apparatus comprises a base structure, a contact structure, and piezoelectric transducers. The piezoelectric transducers are located between the base structure and the contact structure. A preload is present on the piezoelectric transducers.

In another advantageous embodiment, an apparatus comprises a base structure and a piezoelectric transducer array. The piezoelectric transducer array is located between the base structure and an object. A preload is present on the piezoelectric transducer array.

In still another advantageous embodiment, a method for testing a structure is provided. An object is placed in contact with a vibration unit. The vibration unit comprises a base structure, a contact structure, and piezoelectric transducers. The piezoelectric transducers are located between the base structure and the contact structure, and a preload is present on the piezoelectric transducers. A vibration is generated in the object using the vibration unit.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

Figure 1:
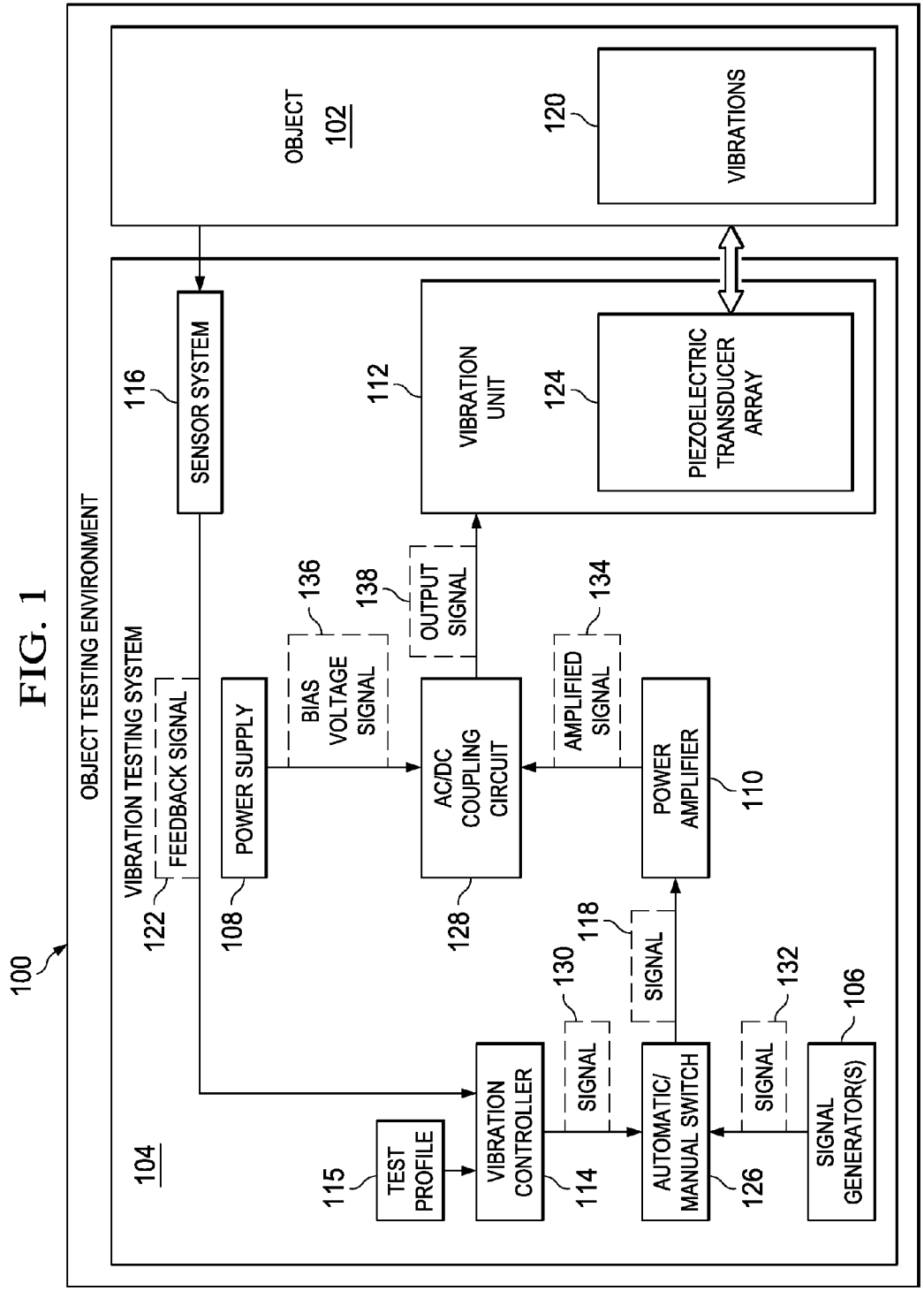
FIG. 1 is an illustration of a block diagram for an object testing environment in accordance with an advantageous embodiment.

With reference now to the figures and, in particular, with reference now to FIG. 1, an illustration of a block diagram for an object testing environment is depicted in accordance with an advantageous embodiment. In this illustrative example, object testing environment 100 includes object 102 which may be tested using vibration testing system 104.

Vibration testing system 104 comprises signal generator(s) 106, power supply 108, power amplifier 110, vibration unit 112, vibration controller 114, and sensor system 116.

As depicted, signal generator 106 generates signal 132, and vibration controller 114 generates signal 130. In one example, vibration controller 114 generates signal 130 using test profile 115. Test profile 115 includes different frequencies that are to be generated by vibration unit 112 for testing object 102. Test profile 115 may include, for example, an identification of frequencies to be generated and when the frequencies are to be generated.

Signal generator(s) 106 is configured to generate signal 132 in response to input from a human operator. The human operator may control signal generator(s) 106 to generate signal 132 such that vibration unit 112 generates a desired frequency of vibrations in object 102.

Both signals may be sent into automatic/manual switch 126. When automatic/manual switch 126 is in auto position, signal 130 becomes signal 118 output from automatic/manual switch 126. When automatic/manual switch 126 is in manual position, signal 132 also becomes signal 118 output by automatic/manual switch 126.

Power amplifier 110 receives signal 118 and amplifies signal 118 to form amplified signal 134. Amplified signal 134 is an alternating current signal in this example. Power supply 108 is a direct current power supply and is configured to generate bias voltage signal 136. Bias voltage signal 136 is a direct current signal in this example. This bias voltage is configured such that when bias voltage signal 136 is mixed with amplified signal 134, output signal 138 is generated and remains within a desired voltage range for vibration unit 112.

As depicted, alternating current/direct current (AC/DC) coupling circuit 128 combines amplified signal 134 from power amplifier 110 and bias voltage signal 136 from power supply 108 to form output signal 138. Output signal 138 is a combination of a direct current signal and an alternating current signal in this illustrative example. Output signal 138 is sent from AC/DC coupling circuit 128 to vibration unit 112, which generates vibrations 120 in object 102.

Sensor system 116 is configured to detect vibrations 120 and provide feedback signal 122 to vibration controller 114. Feedback signal 122 is used in a computer controlled operation. When object 102 is excited during testing, sensor system 116 generates a voltage proportional to the excitation. The voltage generated by sensor system 116 is sent back to vibration controller 114. Feedback signal 122 is then analyzed and compared with test profile 115. Vibration controller 114 performs necessary adjustments to generate signal 130 to cause vibration unit 112 to generate vibrations as specified in test profile 115. In other words, vibration controller 114 generates signal 130 based on test profile 115 in this particular example.

Test profile 115 may include a list of requirements to create the vibration environment for object 102. These requirements may be in the form of frequencies and amplitudes. Test profile 115 may be in a data structure, input into vibration controller 114 via a user input device, or some combination thereof. The data structure may be, for example, a file, a database, or some other suitable data structure. The user input device may be, for example, a keyboard, a mouse, a touch screen, and/or some other user input devices.

In manual operation, signal generator 106 generates signal 132 which is fed into automatic/manual switch 126. Signal 132 forms signal 118 which is used to drive power amplifier 110. Feedback signal 122 and vibration controller 114 are not used in manual operation of vibration testing system 104.

In these illustrative examples, vibration unit 112 may be a shaker. Vibration unit 112 may be implemented using piezoelectric transducer array 124 in accordance with an advantageous embodiment.

An advantageous embodiment takes advantage of unique properties of piezoelectric materials used in piezoelectric transducers in piezoelectric transducer array 124. These materials convert mechanical energy such as pressure into electrical energy, or in an opposing manner, these materials convert electrical energy into mechanical energy.

In one or more advantageous embodiments, electrical energy is applied to piezoelectric transducers, resulting in the compression and expansion of these devices. As a result, piezoelectric transducer array 124 can be controlled by vibration controller 114 to produce sinusoidal vibrations of simple harmonic motion or multi-frequency random vibrations at various frequencies. These frequencies may be from about 10,000 Hz to about 100,000 Hz.

Object 102 may be placed in contact with vibration unit 112. For example, object 102 may be placed on vibration unit 112, clamped to vibration unit 112, or in contact with vibration unit 112 in some other form, depending on the particular implementation. Object 102 also may be referred to as an object under test.

Vibration controller 114 is configured to control the operation of vibration testing system 104. Vibration controller 114 may be implemented using hardware, software, or a combination of the two. For example, vibration controller 114 may take the form of a computer system. A computer system may take the form of hardware circuits.

In these illustrative examples, vibration controller 114 is configured to control the operation of piezoelectric transducers in piezoelectric transducer array 124 such that the piezoelectric transducers expand and contract to produce a load in a manner similar to a single device. In other words, the piezoelectric transducers may expand and contract at substantially the same time and substantially the same amount.

Further, vibration controller 114 may control piezoelectric transducer array 124 to generate multiple tones to simulate various types of loading that may occur on object 102. In this manner, vibration testing system 104 may be used to test objects under various conditions. In particular, vibration testing system 104 may generate vibrations 120 that simulate conditions encountered when an object is carried on a launch vehicle, a missile, a rocket, or some other similar type of platform. Vibrations 120 with a desired level of intensity may be used to generate a simulation of an environment with different G forces for object 102 that may be encountered during a launch event.

The illustration of object testing environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, if signal generator 106 is manually controlled rather than computer controlled, sensor system 116 and feedback signal 122 may be unnecessary. As another illustrative example, vibration unit 112 may induce vibrations 120 in one or more objects in addition to object 102.

As another illustrative example, vibration controller 114 may be divided into two blocks with one block being a computer controller and another block being a circuit controller. Further, in some illustrative examples, vibration controller 114 may be under the control of a human operator that provides input to control various components in vibration testing system 104.

In addition to generating vibrations 120 for launch vehicles, missiles, rockets, or other similar platforms, vibration testing system 104 may generate vibrations 120 to simulate other environments. Vibrations 120 may be those encountered during at least one of launch and reentry. For example, vibration testing system 104 also may generate vibrations 120 to simulate conditions when object 102 is located in a vehicle such as an automobile, an aircraft, a spacecraft, or some other suitable type of vehicle.

As another example, vibration testing system 104 also may generate vibrations 120 with a desired level of intensity to simulate conditions in a generator, manufacturing equipment, and/or other environments in which vibrations are encountered. These vibrations may have a desired number of frequencies. As used herein, a "number of", when used with reference to items, means one or more items. For example, a number of frequencies is one or more frequencies. The desired number of frequencies may be a single frequency or a range for frequencies in which the range may be either contiguous or non-contiguous.

Figure 2:
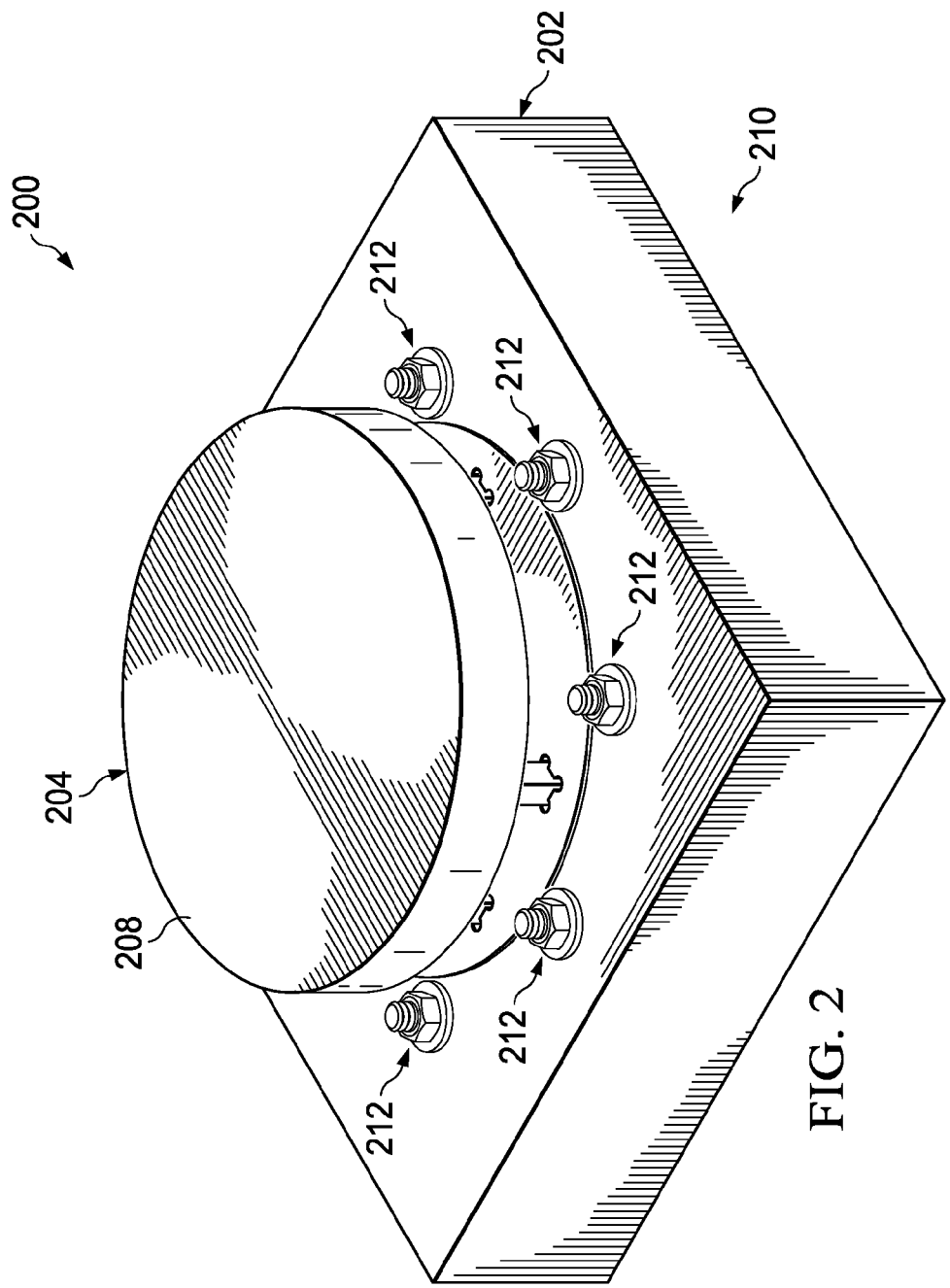
FIG. 2 is an illustration of a vibration unit in accordance with an advantageous embodiment.

Turning next to FIG. 2, an illustration of a vibration unit is depicted in accordance with an advantageous embodiment. In this illustrative example, a perspective view of vibration unit 200 is shown. As depicted, vibration unit 200 is an example of one implementation for vibration unit 112 shown in block form in FIG. 1.

As depicted, vibration unit 200 includes base structure 202, contact structure 204, and piezoelectric transducer system 206. Vibration unit 200 may be used to test an object in contact with surface 208 of contact structure 204. In this particular example, the object may be placed on surface 208 of contact structure 204.

As illustrated, base structure 202 is located on floor 210. Base structure 202 may be secured to floor 210 using fastener system 212.

Figure 3:
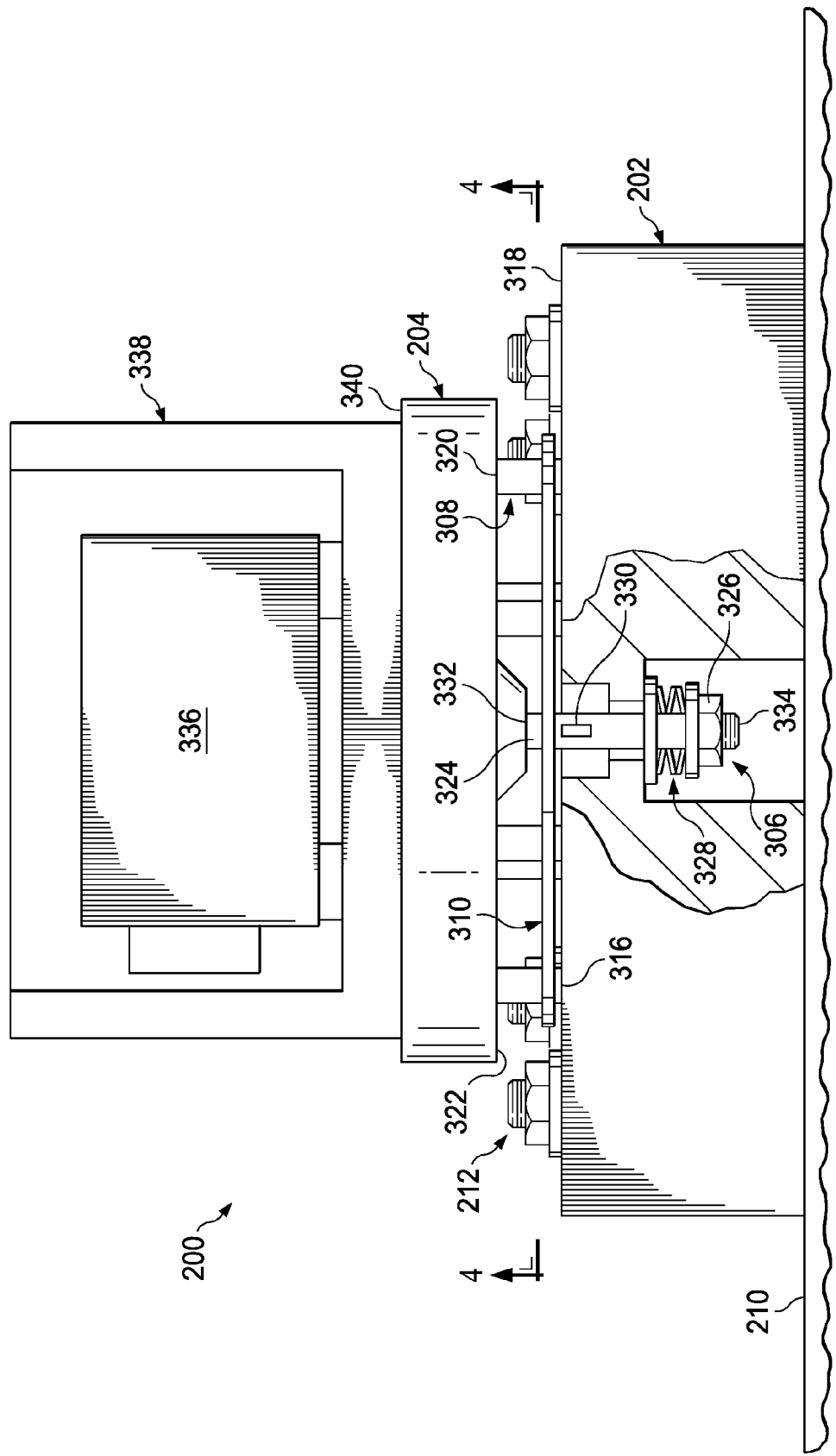
FIG. 3 is an illustration of a vibration unit in accordance with an advantageous embodiment.

Turning next to FIG. 3, an illustration of a vibration unit is depicted in accordance with an advantageous embodiment. As depicted, vibration unit 200 is shown in a side view partially exposed. In this view, vibration unit 200 includes base structure 202, contact structure 204, preload system 306, piezoelectric transducer array 308, and alignment structure 310.

In this illustrative example, base structure 202 is located on floor 210. In this illustrative example, base structure 202 takes the form of a plate. Base structure 202 is selected to have a mass that provides a rigid base for piezoelectric transducer array 308 during operation of vibration unit 200.

Base structure 202 may be comprised of different types of materials. For example, without limitation, base structure 202 may be comprised of a material selected from at least one of a metal, steel, aluminum, titanium, a metal alloy, polycarbonate, and other suitable materials. As used herein, the phrase "at least one of", when used with a list of items, means different combinations of one or more of the listed items may be used and only one of each item in the list may be needed. For example, "at least one of item A, item B, and item C" may include, without limitation, item A, or item A and item B. This example also may include item A, item B, and item C, or item B and item C.

Base structure 202 is attached to floor 210 using fastener system 212 in these illustrative examples. In some cases, fastener system 212 may be unnecessary. Further, base structure 202 may be attached to other structures other than floor 210. For example, base structure 202 may be attached to a concrete pad, another base structure, or some other suitable structure.

Piezoelectric transducer array 308 is located between base structure 202 and contact structure 204. Piezoelectric transducer array 308 is configured to provide vibrations at a desired frequency with a desired amount of force. The force may be measured in Gs.

Alignment structure 310 is a structure configured to hold piezoelectric transducers within piezoelectric transducer array 308 in a desired configuration. Alignment structure 310 may take a number of different forms. In this illustrative example, alignment structure 310 may take the form of a disk-shaped structure.

Alignment structure 310 may be comprised of any suitable material that may hold piezoelectric transducers in piezoelectric transducer array 308 in the desired configuration. For example, without limitation, alignment structure 310 may be comprised of a material selected from one of steel, aluminum, titanium, a metal alloy, polycarbonate, and other suitable materials. In some cases, multiple types of materials may be used in alignment structure 310. As another example, a resin, tape, and/or some other material may be used to maintain spacing between piezoelectric transducers within piezoelectric transducer array 308.

As depicted, first side 316 of piezoelectric transducer array 308 is in physical contact with surface 318 of base structure 202. Second side 320 of piezoelectric transducer array 308 is in physical contact with surface 322 of contact structure 204.

Contact structure 204 is configured to provide contact with an object under test. This contact may be direct contact or indirect contact with the object under test.

In these illustrative examples, contact structure 204 takes the form of a plate. Contact structure 204 may be comprised of different types of materials. For example, contact structure 204 may be comprised of a material selected from one of steel, aluminum, titanium, and/or other suitable materials. In one illustrative example, contact structure 204 may be selected to have a mass that is less than the mass of base structure 202.

In these illustrative examples, physical contact between piezoelectric transducer array 308 and base structure 202 along with physical contact with contact structure 204 may be desirable during operation of vibration unit 200. Loss of contact with these two components may reduce vibrations that may be applied to an object under test such as inertial measurement unit 336 and/or structure 338.

Preload system 306 is configured to maintain contact between these components. Preload system 306 is configured to apply a load to piezoelectric transducer array 308 prior to operation of vibration unit 200. This load is referred to as a "preload" in these depicted examples. Preload system 306 is configured to force contact structure 204 and base structure 202 towards each other with piezoelectric transducer array 308 between these two structures.

In this partially exposed view, preload system 306 includes tie rod 324, nut 326, Belleville springs 328, and strain gauge 330. First end 332 of tie rod 324 is associated with base structure 202. The association is a physical association in these depicted examples. A first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component also may be considered to be associated with the second component by being formed as part of and/or an extension of the second component.

Nut 326 and Belleville springs 328 may be located proximate to second end 334 of tie rod 324. Nut 326 may be fastened to tie rod 324 and may be manipulated to pull contact structure 204 toward base structure 202. Belleville springs 328 provide a biasing mechanism to bias contact structure 204 and base structure 202 toward each other. In this manner, a preload is applied to piezoelectric transducer array 308. Strain gauge 330 is used to identify the amount of load that is applied.

In this illustrative example, inertial measurement unit 336 and structure 338 are examples of objects that may be tested using vibration unit 200. Inertial measurement unit 336 is placed inside of structure 338 as seen in this partially exposed view. Structure 338 is placed on surface 340 of contact structure 204.

In this illustrative example, inertial measurement unit 336 may be the object under test with structure 338 being a structure to which inertial measurement unit 336 is placed on or connected to during actual use of inertial measurement unit 336. In this example, contact structure 204 is indirectly in contact with inertial measurement unit 336 through structure 338. In other illustrative examples, contact structure 204 may be in direct contact with inertial measurement unit 336.

As depicted, inertial measurement unit 336 and structure 338 do not need to be secured to contact structure 204. In some illustrative examples, one or more of inertial measurement unit 336 and structure 338 may be secured to contact structure 204 using a fastener system, a clamping system, or some other suitable system. With the application of this preload, piezoelectric transducer array 308 may maintain physical contact with surface 318 of base structure 202 and surface 322 of contact structure 204 during operation of vibration unit 200.

Figure 4:
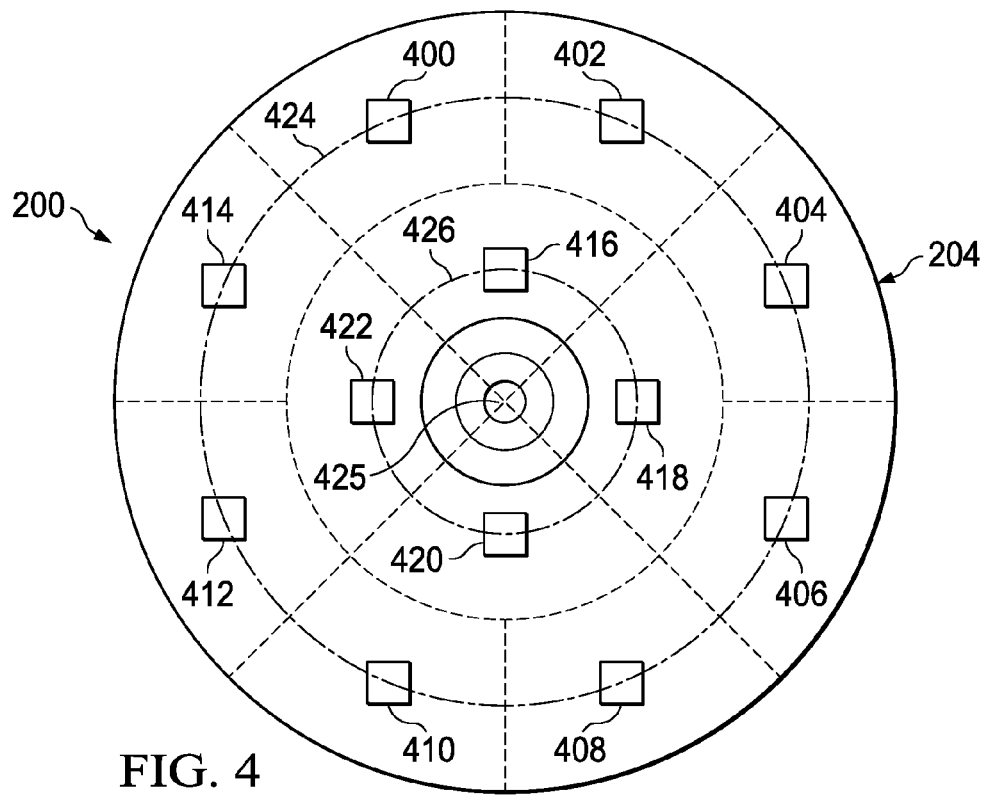
FIG. 4 is an illustration of a portion of a vibration unit in accordance with an advantageous embodiment.

With reference now to FIG. 4, an illustration of a portion of a vibration unit is depicted in accordance with an advantageous embodiment. In this illustrative example, a view of vibration unit 200 taken along lines 4-4 is illustrated.

In this view of vibration unit 200, piezoelectric transducers 400, 402, 404, 406, 408, 410, 412, 414, 416, 418, 420, and 422 are seen in piezoelectric transducer array 308 in FIG. 3. These piezoelectric transducers are seen with respect to contact structure 204.

In these illustrative examples, piezoelectric transducers 400, 402, 404, 406, 408, 410, 412, and 414 are arranged with substantially even spacing around diameter 424 around center point 425. Piezoelectric transducers 416, 418, 420, and 422 are arranged with substantially even spacing around diameter 426 around center point 425. As depicted, the different piezoelectric transducers are substantially evenly spaced around each of the diameters. As depicted, diameter 424 is about 5.51 inches, while diameter 426 is about 2.02 inches. Diameter 424, diameter 426, and piezoelectric transducer spacing are chosen to allow each piezoelectric transducer to apply vibration to an equal mass fraction of the total mass of contact structure 204.

Figure 5:
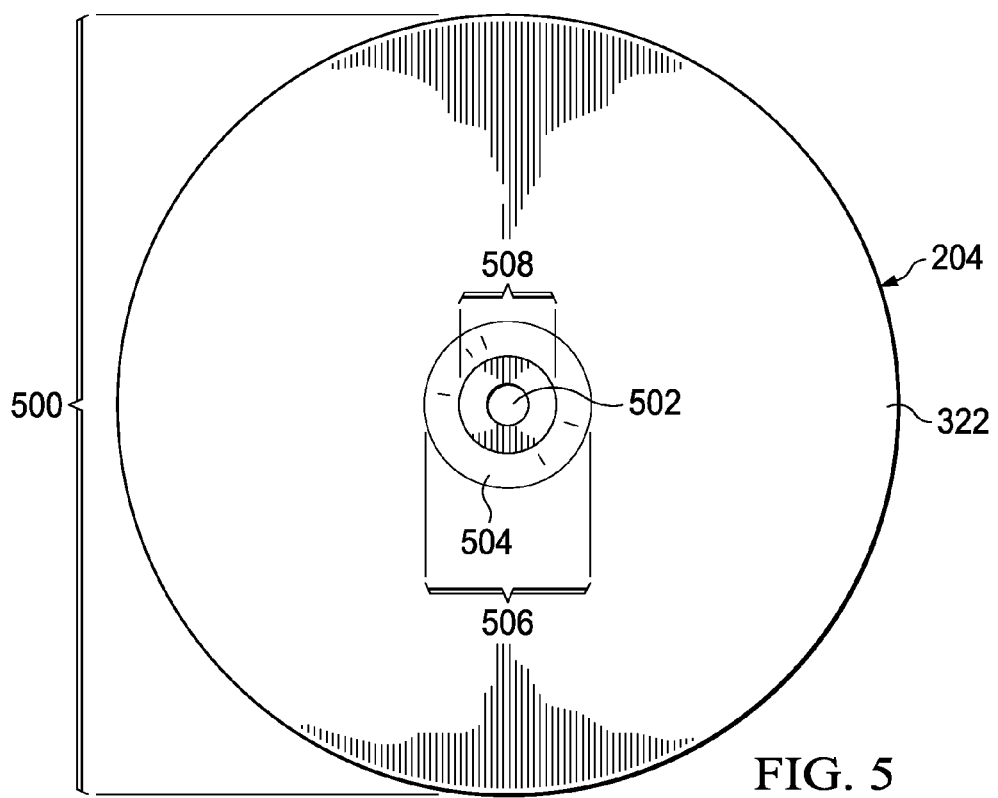
FIG. 5 is an illustration of a contact structure in accordance with an advantageous embodiment.

Turning now to FIG. 5, an illustration of a contact structure is depicted in accordance with an advantageous embodiment. In this illustrative example, surface 322 of contact structure 204 in FIG. 3 is shown. Contact structure 204 has diameter 500.

Also, contact structure 204 has channel 502 in raised section 504. Channel 502 is configured to receive first end 332 of tie rod 324 in FIG. 3.

Raised section 504 has diameter 506 and diameter 508. Diameter 506 reduces to diameter 508 as raised section 504 extends from surface 322 of contact structure 204. In this illustrative example, contact structure 204 has diameter 500. In these illustrative examples, diameter 500 is about 7.00 inches. Diameter 506 is about 1.50 inches, and diameter 508 is about 1.00 inch.

Figure 6:
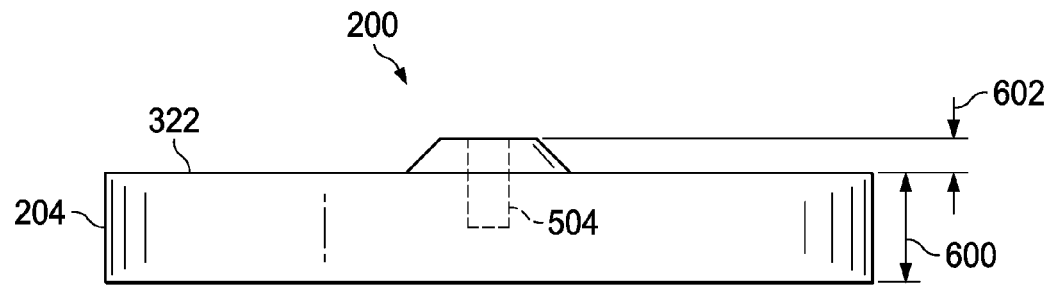
FIG. 6 is an illustration of a side view of a contact structure in accordance with an advantageous embodiment.

Turning now to FIG. 6, an illustration of a side view of a contact structure is depicted in accordance with an advantageous embodiment. As depicted, contact structure 204 has thickness 600 and raised section 504 has thickness 602. Thickness 600 is about 1.00 inch, while thickness 602 is about 0.25 inches.

The different values for dimensions, such as diameters and thicknesses, in the different figures are only provided for purposes of illustrating one illustrative example. Other examples may have different dimensions depending on the particular implementation.

Figure 7:
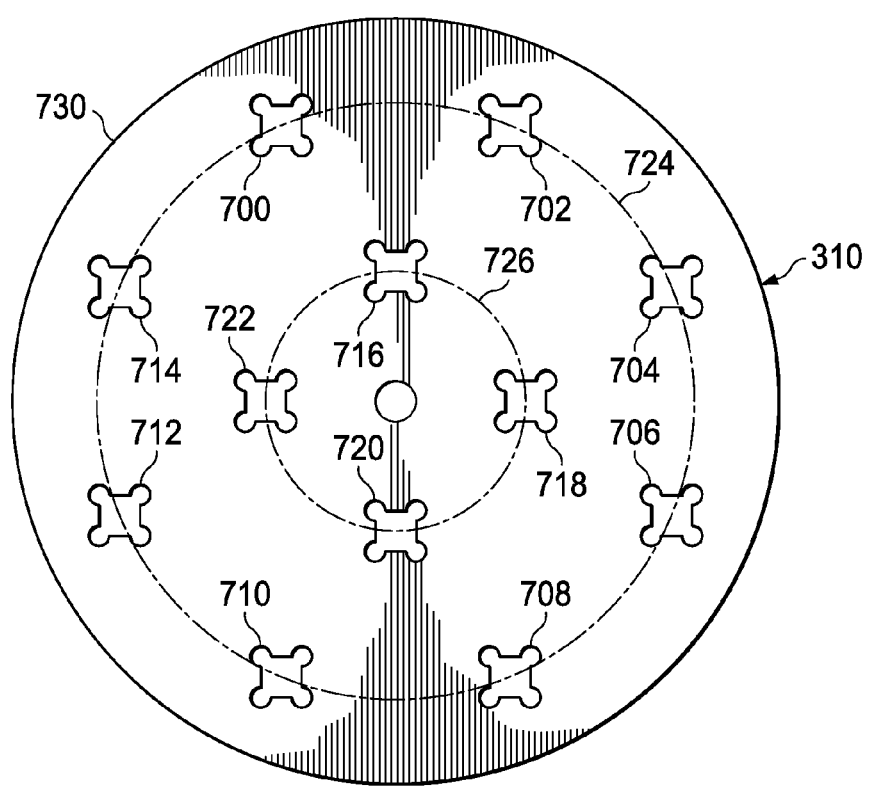
FIG. 7 is an illustration of an alignment structure in accordance with an advantageous embodiment.

Turning now to FIG. 7, an illustration of an alignment structure is depicted in accordance with an advantageous embodiment. Alignment structure 310 is configured to maintain the locations of the different piezoelectric transducers during operation of vibration unit 200.

In this illustrative example, alignment structure 310 has holes 700, 702, 704, 706, 708, 710, 712, 714, 716, 718, 720, and 722. Each of these holes in alignment structure 310 is configured to receive a piezoelectric transducer in piezoelectric transducer array 308 as depicted in FIGS. 3 and 4.

Holes 700, 702, 704, 706, 708, 710, 712, and 714 are spaced with substantially even spacing about diameter 724. Holes 716, 718, 720, and 722 are spaced with substantially even spacing about diameter 726. Diameter 724 is about 5.51 inches, while diameter 726 is about 2.63 inches. Diameter 730 of alignment structure 310 is about 7.00 inches.

Figure 8:
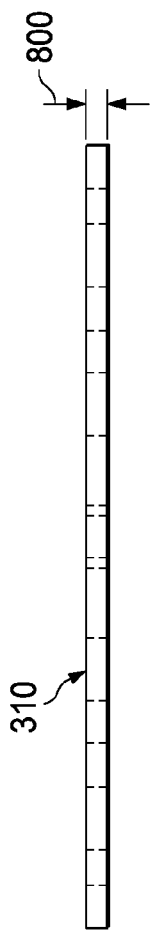
FIG. 8 is an illustration of a side view of an alignment structure in accordance with an advantageous embodiment.

Turning now to FIG. 8, an illustration of a side view of an alignment structure is depicted in accordance with an advantageous embodiment. Alignment structure 310 has thickness 800. Thickness 800 is about 0.19 inches in this illustrative example.

Figure 9:
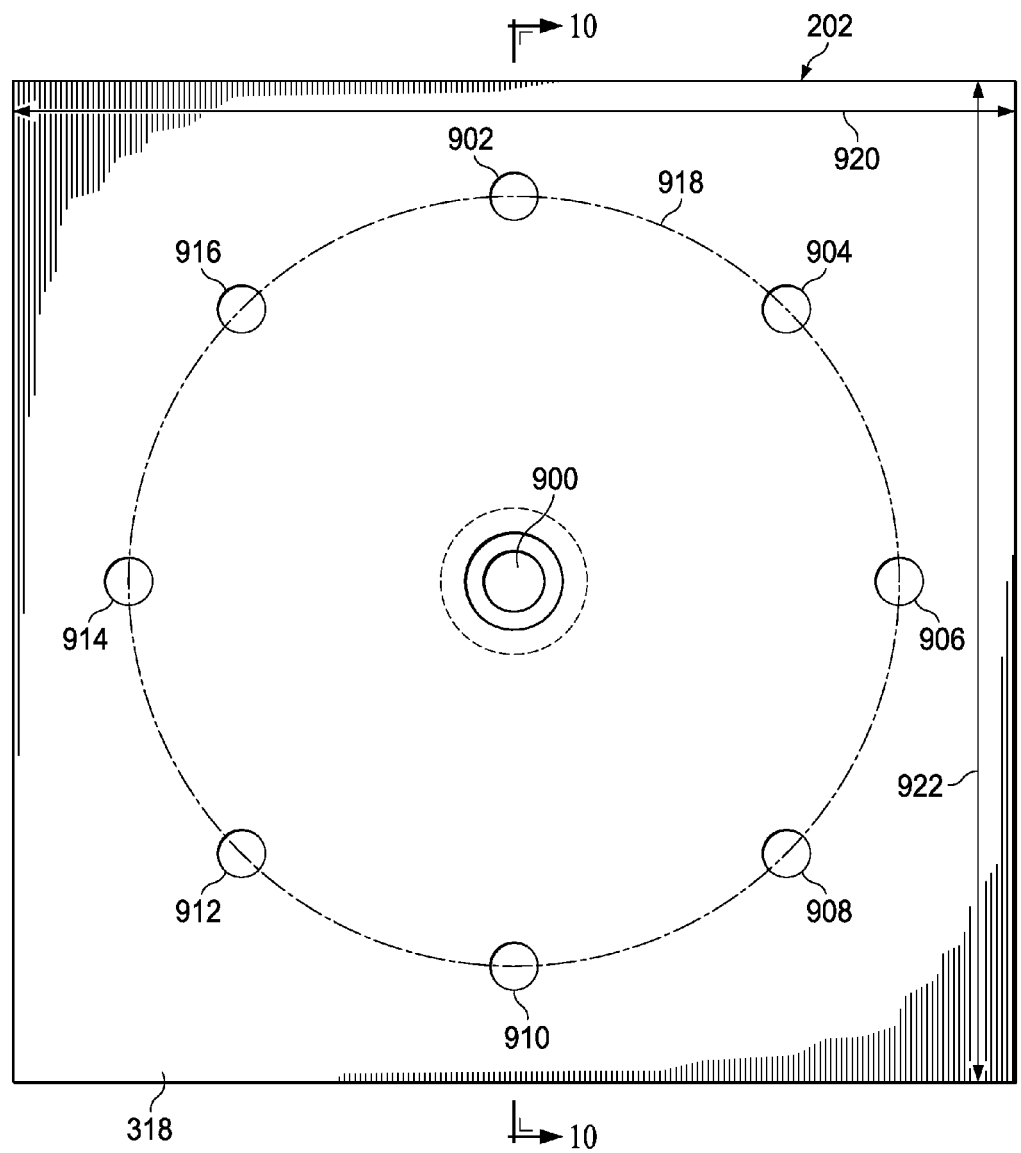
FIG. 9 is an illustration of a base structure in accordance with an advantageous embodiment.

Turning next to FIG. 9, an illustration of a base structure is depicted in accordance with an advantageous embodiment. Surface 318 of base structure 202 is seen in this view. Base structure 202 has channel 900. Channel 900 is configured to receive tie rod 324 in FIG. 3.

Additionally, base structure 202 also has channels 902, 904, 906, 908, 910, 912, 914, and 916. These channels are configured to receive fasteners in fastener system 212 in FIG. 3. Channels 902, 904, 906, 908, 910, 912, 914, and 916 are substantially evenly spaced about diameter 918.

In this illustrative example, base structure 202 has width 920 and length 922. Both width 920 and length 922 are about 12.00 inches.

Figure 10:
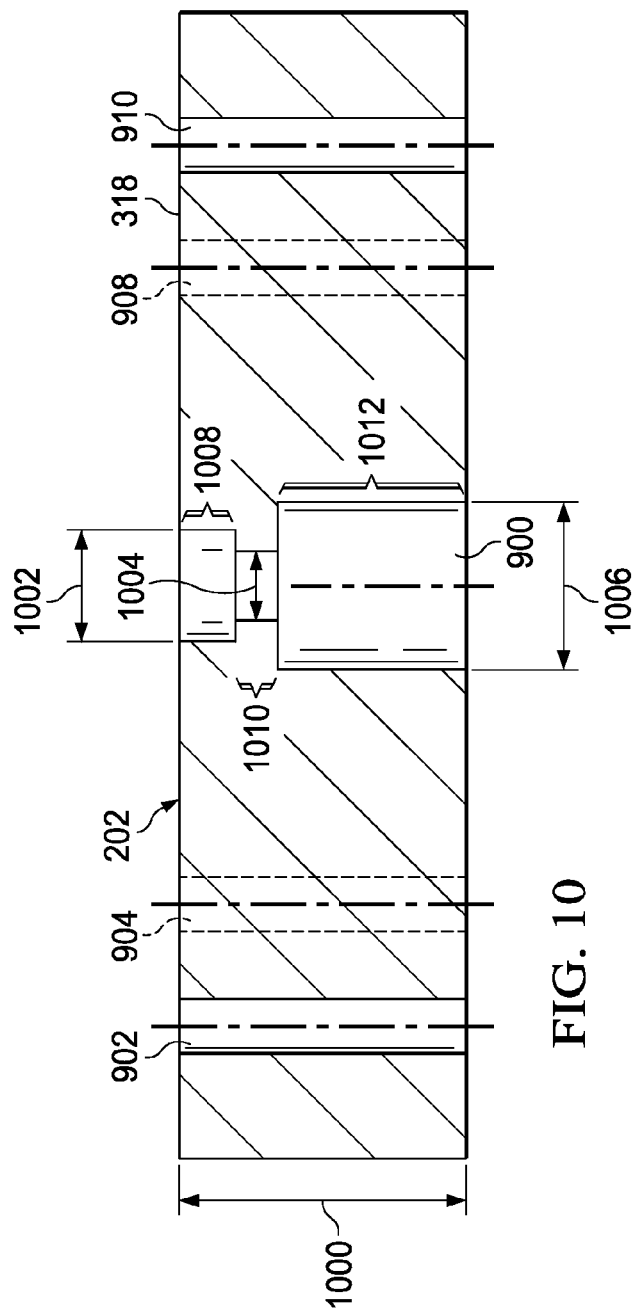
FIG. 10 is an illustration of a cross-sectional view of a base structure in accordance with an advantageous embodiment.

Turning next to FIG. 10, an illustration of a cross-sectional view of a base structure is depicted in accordance with an advantageous embodiment. A cross-sectional view of base structure 202 taken along lines 10-10 in FIG. 9 is depicted.

In this view, base structure 202 has thickness 1000. Additionally, channel 900 has a diameter that changes as channel 900 extends through base structure 202. In this illustrative example, channel 900 has diameter 1002, diameter 1004, and diameter 1006. Diameter 1002 is about 1.00 inch. Diameter 1004 is about 0.53 inches. Diameter 1006 is about 1.06 inches. Channel 900 has diameter 1002 for length 1008. Channel 900 has diameter 1004 for length 1010. Channel 900 has diameter 1006 for length 1012. Length 1008 is about 0.50 inches. Length 1010 is about 0.50 inches. Length 1012 is about 1.50 inches.

Figure 11:
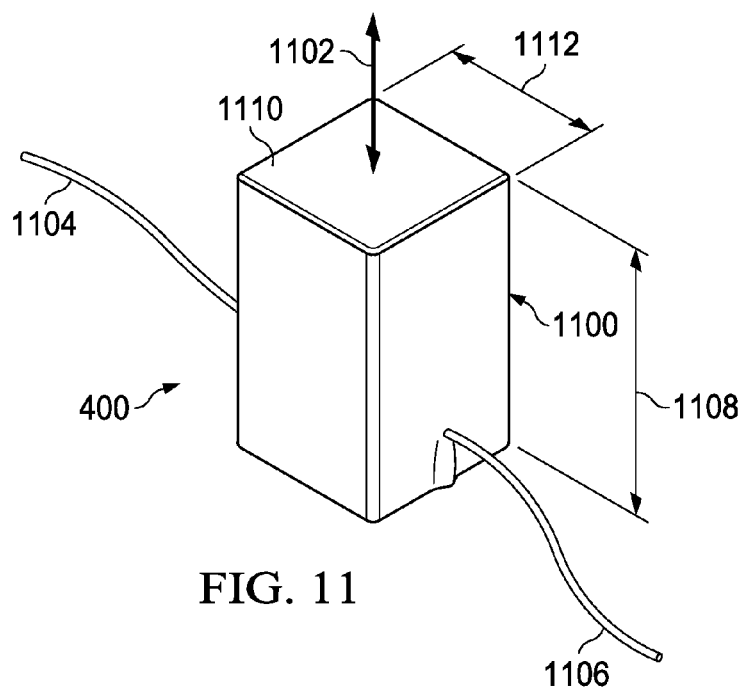
FIG. 11 is an illustration of a piezoelectric transducer in accordance with an advantageous embodiment.

Turning now to FIG. 11, an illustration of a piezoelectric transducer is depicted in accordance with an advantageous embodiment. In this illustrative example, piezoelectric transducer 400 in FIG. 4 is formed from multiple piezoelectric layers that are stacked on top of each other.

As depicted, piezoelectric transducer 400 takes the form of a piezo stack. Piezo stack 1100 may expand and contract in the direction of arrow 1102. In these illustrative examples, power is supplied to piezo stack 1100 through wires 1104 and 1106.

In this illustrative example, piezo stack 1100 has height 1108, and side 1110 of piezo stack 1100 has length 1112. Height 1108 is about 0.71 inches. Length 1112 is about 0.44 inches. Piezo stack 1100 has a square cross-sectional shape in these illustrative examples.

Of course, other shapes of piezo stacks may be used. For example, piezo stack 1100 may be implemented having a cross-sectional shape of a circle, a hexagon, a rectangle, or some other suitable shape.

Piezo stack 1100 may be connected to a power supply, such as power supply 108 in FIG. 1. Piezo stack 1100 may be connected to a power supply by wire 1104 and wire 1106.

Figure 12:
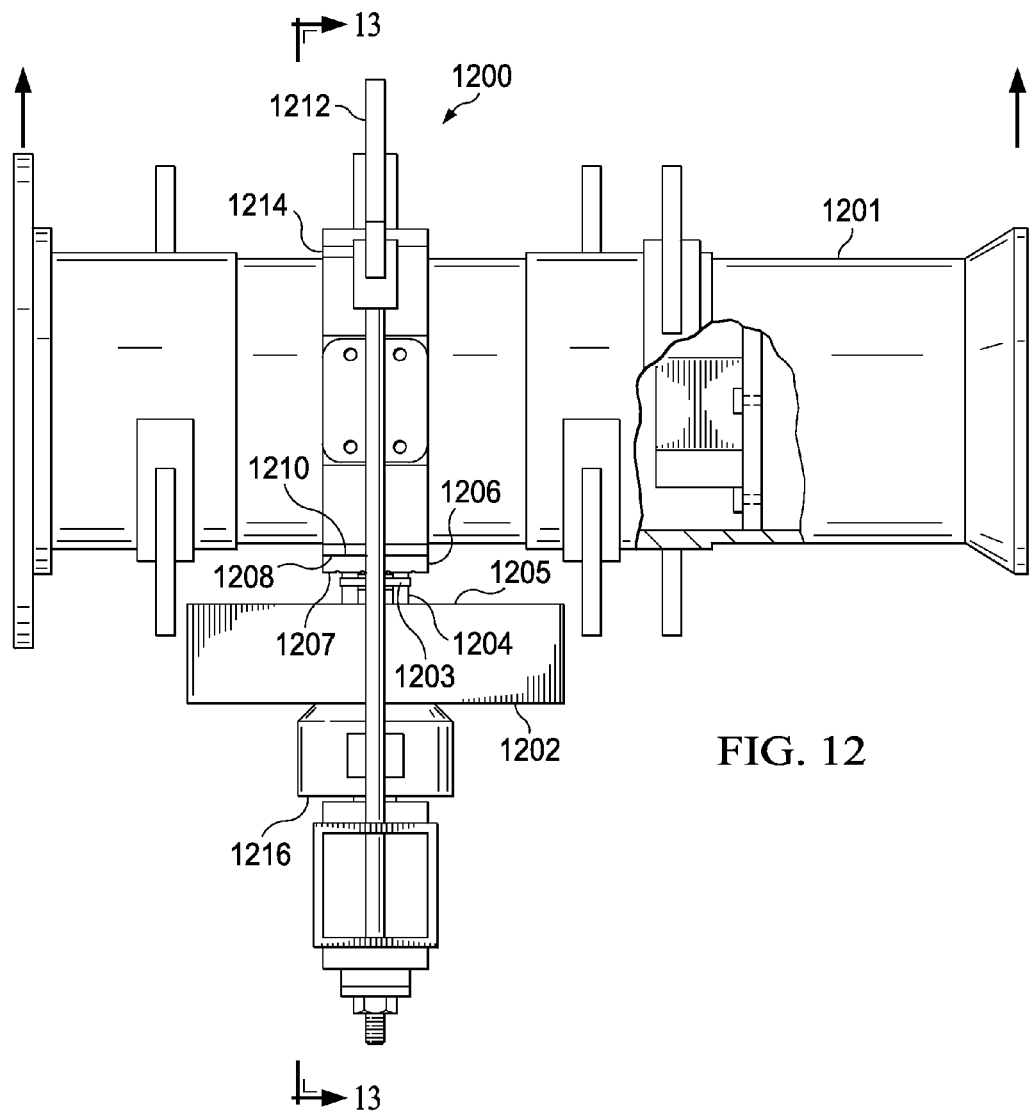
FIG. 12 is an illustration of a vibration unit in accordance with an advantageous embodiment.

Turning now to FIG. 12, an illustration of a vibration unit is depicted in accordance with an advantageous embodiment. In this illustrative example, vibration unit 1200 is an example of another implementation for vibration unit 112 shown in block form in FIG. 1.

In this illustrative example, vibration unit 1200 is in physical contact with object 1201. As depicted, vibration unit 1200 comprises base structure 1202, piezoelectric transducer array 1204, alignment structure 1203, and contact structure 1206.

Piezoelectric transducer array 1204 is located between contact structure 1206 and base structure 1202. More specifically, piezoelectric transducer array 1204 is in contact with surface 1205 of base structure 1202 and is also in contact with surface 1207 of contact structure 1206. Surface 1208 of contact structure 1206 is in physical contact with surface 1210 of object 1201.

In this illustrative example, clamping system 1212 is configured to maintain contact between object 1201 and vibration unit 1200. As illustrated, clamping system 1212 holds object 1201 to vibration unit 1200. Further, clamping system 1212 holds base structure 1202, piezoelectric transducer array 1204, and contact structure 1206 against each other.

Further, clamping system 1212 also is configured to function as a preload system and generate a preload for piezoelectric transducer array 1204. Reaction pad 1214 provides a biasing mechanism in clamping system 1212. Reaction pad 1214 provides a function similar to Belleville springs 328 in FIG. 3. Reaction pad 1214 is configured to be compressed by clamping system 1212 and generate a force that provides a preload for piezoelectric transducer array 1204. In these illustrative examples, load cell 1216 is a sensor that is configured to detect a load on piezoelectric transducer array 1204.

Figure 13:
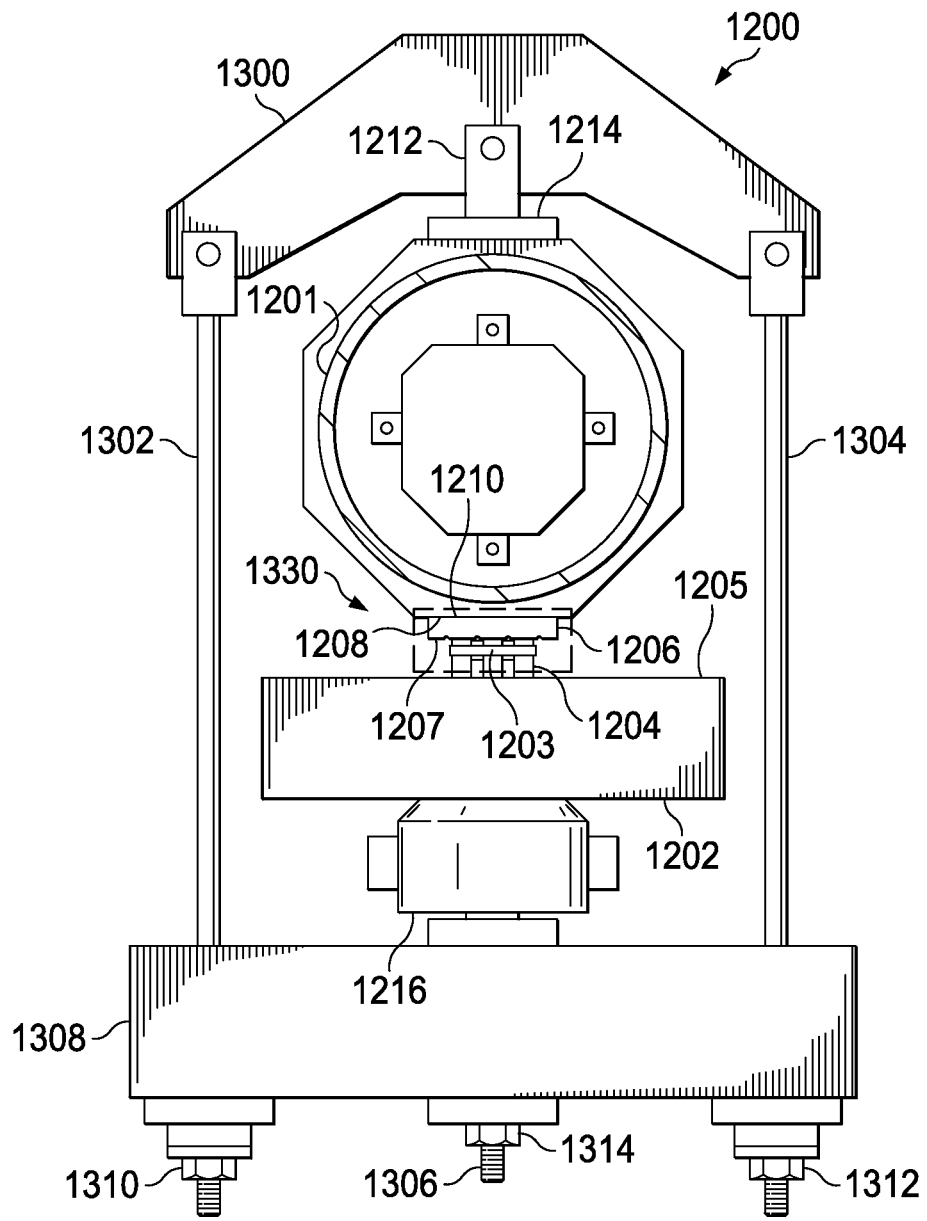
FIG. 13 is an illustration of a cross-sectional view of a vibration unit in accordance with an advantageous embodiment.

Turning now to FIG. 13, an illustration of a cross-sectional view of vibration unit 1200 is depicted in accordance with an advantageous embodiment. This cross-sectional view is taken along lines 13-13 in FIG. 12.

In this view, linkage bar 1300, tie rod 1302, tie rod 1304, tie rod 1306, and tube 1308 are shown. Tie rod 1302 and tie rod 1304 are configured to connect linkage bar 1300 to tube 1308. Tie rod 1306 is configured to connect tube 1308 to base structure 1202.

Nut 1310 and nut 1312 are configured to secure tie rod 1302 and tie rod 1304 to tube 1308, respectively. Nut 1310 is configured to secure tie rod 1302 to tube 1308. Nut 1312 is configured to secure tie rod 1304 to tube 1308. Nut 1314 is configured to secure tie rod 1306 to tube 1308. Tie rod 1306 is associated with load cell 1216. A preload may be generated by manipulating nuts 1310, 1312, and 1314 to pull tube 1308 and linkage bar 1300 towards each other. A more detailed illustration of vibration unit 1200 in section 1330 is depicted in FIG. 14.

Figure 14:
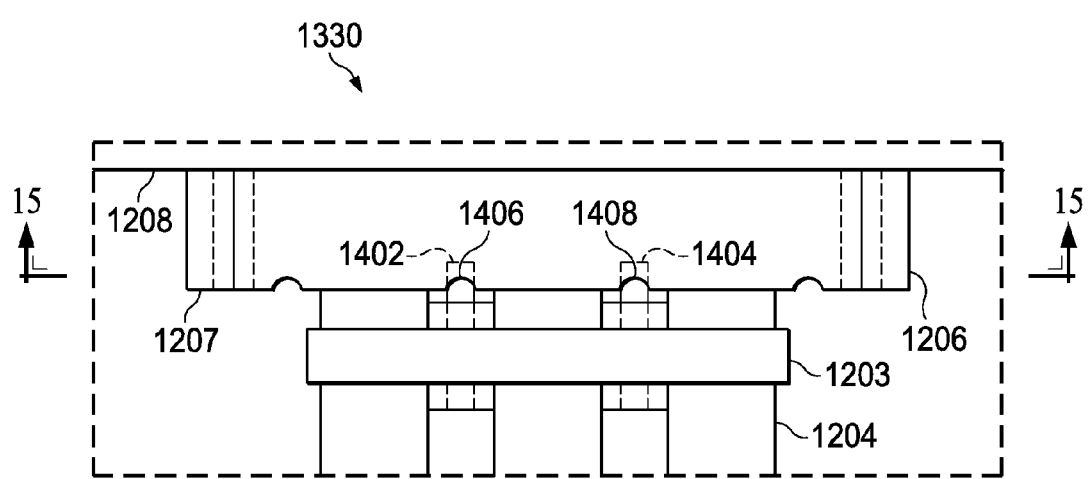
FIG. 14 is a more detailed illustration of a contact structure and a piezoelectric transducer array in accordance with an advantageous embodiment.

Turning next to FIG. 14, a more detailed illustration of a contact structure and a piezoelectric transducer array is depicted in accordance with an advantageous embodiment. A more detailed illustration of section 1330 in FIG. 13 is shown in this figure.

In this illustrative example, a portion of alignment structure 1203 is depicted as being in contact with contact structure 1206. Alignment structure 1203 includes alignment pins 1402 and 1404. These alignment pins may be placed into channel 1406 and channel 1408, respectively, in contact structure 1206. These pins provide a mechanism to align piezoelectric transducer array 1204 with contact structure 1206 in a desired manner.

Figure 15:
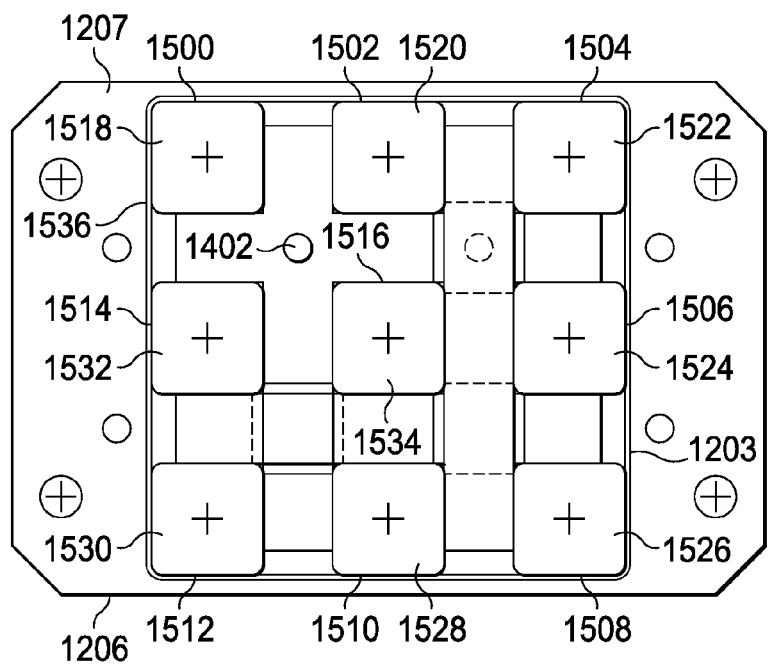
FIG. 15 is an illustration of an alignment structure in accordance with an advantageous embodiment.

Turning now to FIG. 15, an illustration of an alignment structure is depicted in accordance with an advantageous embodiment. In this illustrative example, a cross-sectional view taken along lines 15-15 in FIG. 14 is shown.

In this view, surface 1207 of contact structure 1206 is seen. As depicted, piezoelectric transducer array 1204 has piezoelectric transducers 1500, 1502, 1504, 1506, 1508, 1510, 1512, 1514, and 1516. These piezoelectric transducers extend through holes 1518, 1520, 1522, 1524, 1526, 1528, 1530, 1532, and 1534, respectively, in alignment structure 1203 and contact surface 1207 of contact structure 1206. Additionally, tape 1536 also may be placed around piezoelectric transducers 1500, 1502, 1504, 1506, 1508, 1510, 1512, and 1514.

Figure 16:
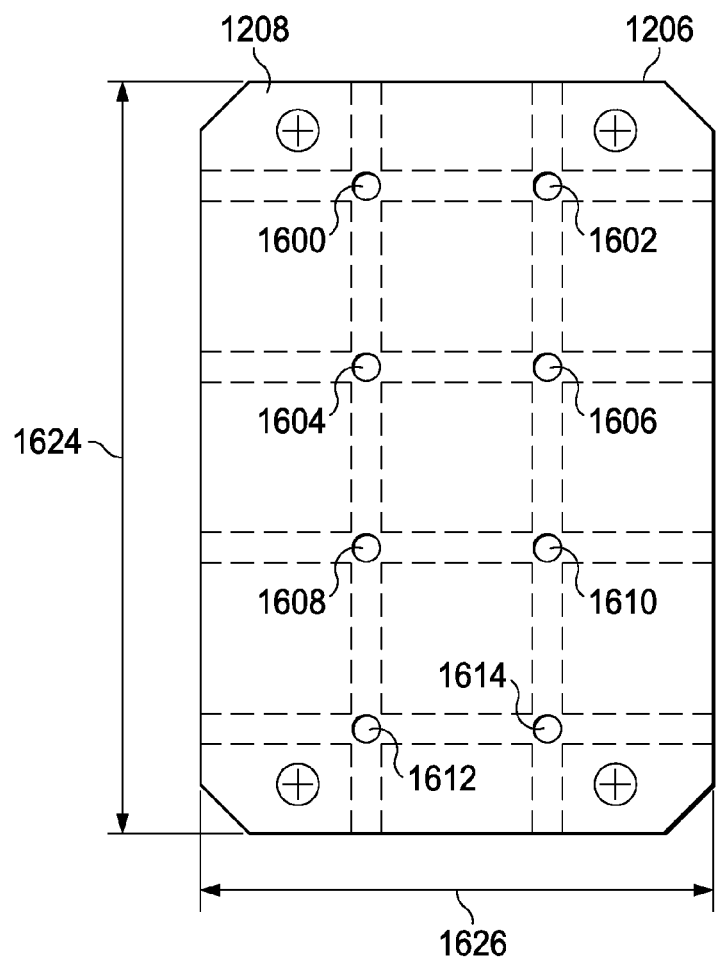
FIG. 16 is a more detailed illustration of a contact structure in accordance with an advantageous embodiment.

Turning now to FIG. 16, a more detailed illustration of a contact structure is depicted in accordance with an advantageous embodiment. In this illustrative example, surface 1208 of contact structure 1206 is shown. In this illustrative example, surface 1208 has holes 1600, 1602, 1604, 1606, 1608, 1610, 1612, and 1614. Surface 1208 is configured to contact object 1201 in FIG. 12.

In this depicted example, contact structure 1206 has length 1624 and length 1626. Length 1626 is about 2.10 inches. Length 1624 is about 2.90 inches.

Figure 17:
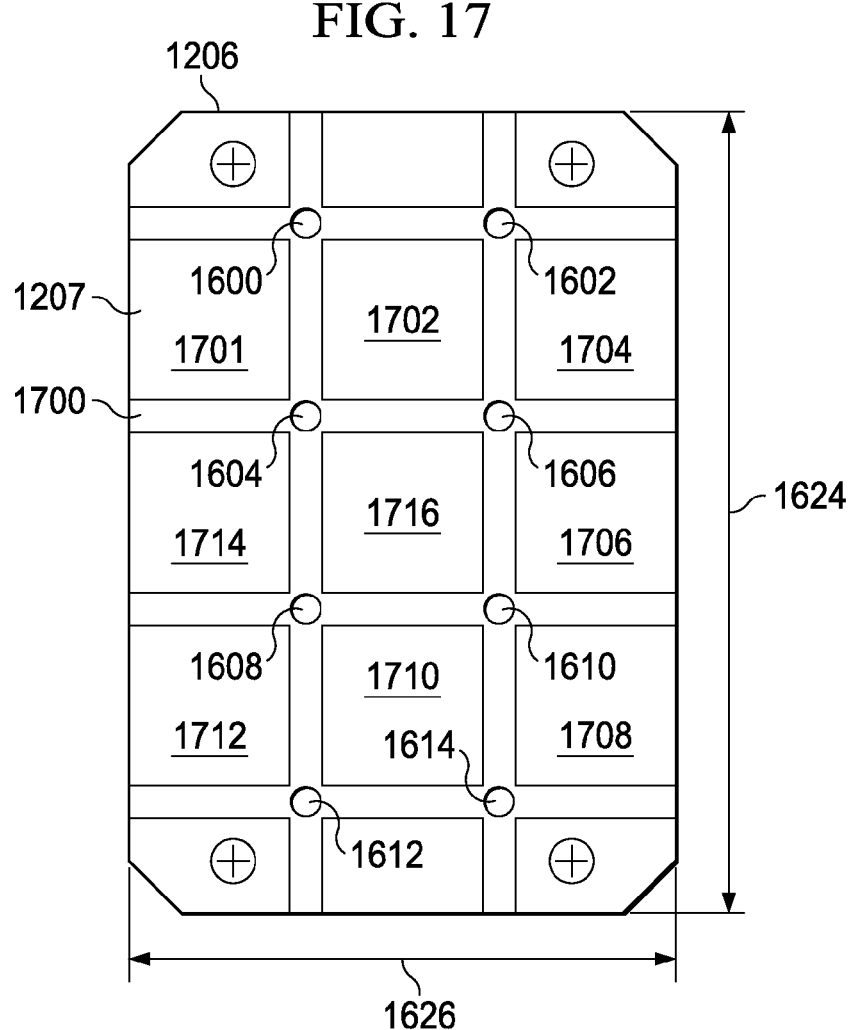
FIG. 17 is an illustration of a contact structure in accordance with an advantageous embodiment.

Turning now to FIG. 17, an illustration of a contact structure is depicted in accordance with an advantageous embodiment. In this illustrative example, surface 1207 of contact structure 1206 is shown. Channels 1700 are present in surface 1207 of contact structure 1206.

Piezoelectric transducers 1500, 1502, 1504, 1506, 1508, 1510, 1512, 1514, and 1516 in piezoelectric transducer array 1204 as depicted in FIG. 15 are arranged to contact sections 1701, 1702, 1704, 1706, 1708, 1710, 1712, 1714, and 1716, respectively, on surface 1207.

A resin may be placed on surface 1207 of contact structure 1206. In particular, the resin may be placed on sections 1701, 1702, 1704, 1706, 1708, 1710, 1712, 1714, and 1716. Piezoelectric transducers 1500, 1502, 1504, 1506, 1508, 1510, 1512, 1514, and 1516 may be placed into contact with the resin on these sections. Excess resin may flow through channels 1700.

The resin is cured. The resin may form a layer between piezoelectric transducer array 1204 and contact structure 1206. In particular, the resin may be located between the ends of piezoelectric transducers 1500, 1502, 1504, 1506, 1508, 1510, 1512, 1514, and 1516 and sections 1701, 1702, 1704, 1706, 1708, 1710, 1712, 1714, and 1716, respectively.

The resin may aid in ensuring all piezoelectric transducers 1500, 1502, 1504, 1506, 1508, 1510, 1512, 1514, and 1516 contact sections 1701, 1702, 1704, 1706, 1708, 1710, 1712, 1714, and 1716, respectively. The resin acts as a shim for piezoelectric transducers 1500, 1502, 1504, 1506, 1508, 1510, 1512, 1514, and 1516 to take into account any differences in length between piezoelectric transducers 1500, 1502, 1504, 1506, 1508, 1510, 1512, 1514, and 1516 on contact structure 1206.

Figure 18:
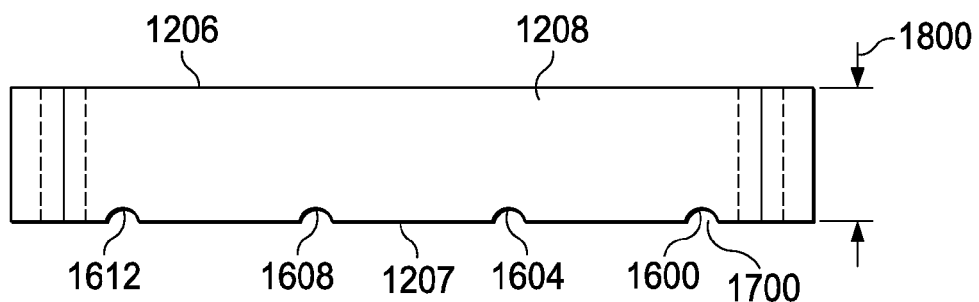
FIG. 18 is an illustration of a side view of a contact structure in accordance with an advantageous embodiment.

Turning now to FIG. 18, an illustration of a side view of a contact structure is depicted in accordance with an advantageous embodiment. In this illustrative example, contact structure 1206 has thickness 1800. Thickness 1800 is about 0.50 inches in this illustrative example.

Figure 19:
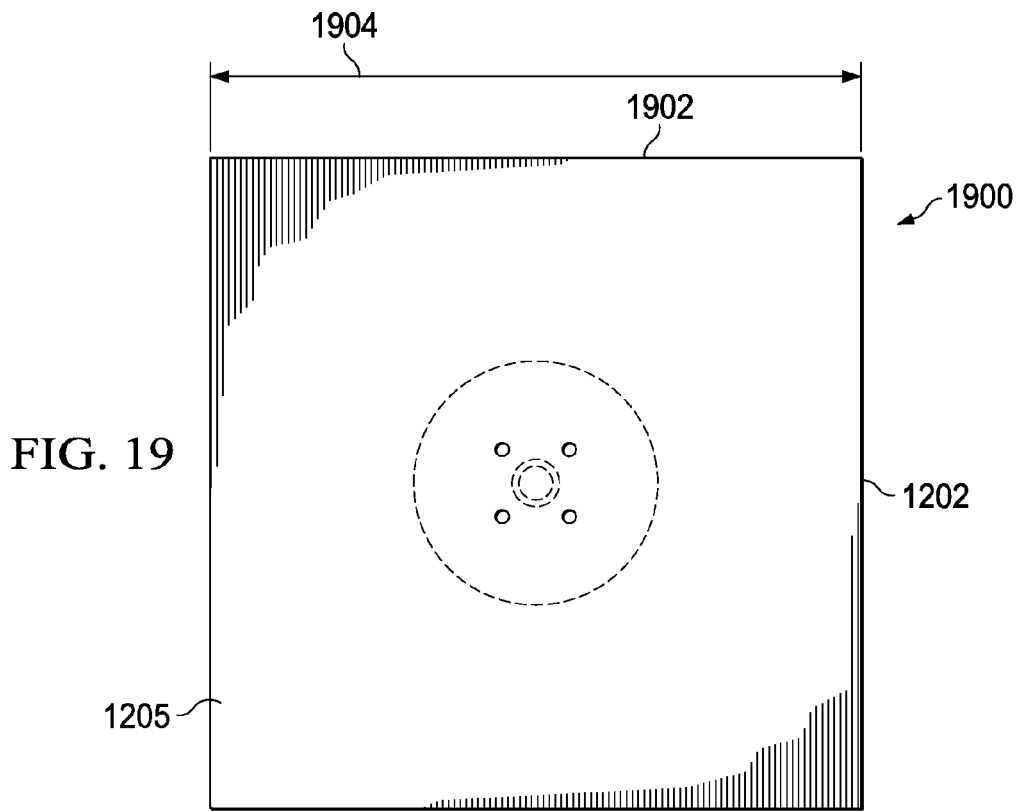
FIG. 19 is an illustration of a base structure in accordance with an advantageous embodiment.

Turning now to FIG. 19, an illustration of a base structure is depicted in accordance with an advantageous embodiment. In this illustrative example, surface 1205 of base structure 1202 is shown. Base structure 1900 is square in shape, and side 1902 has width 1904. Width 1904 is about 10.00 inches in this illustrative example.

Figure 20:
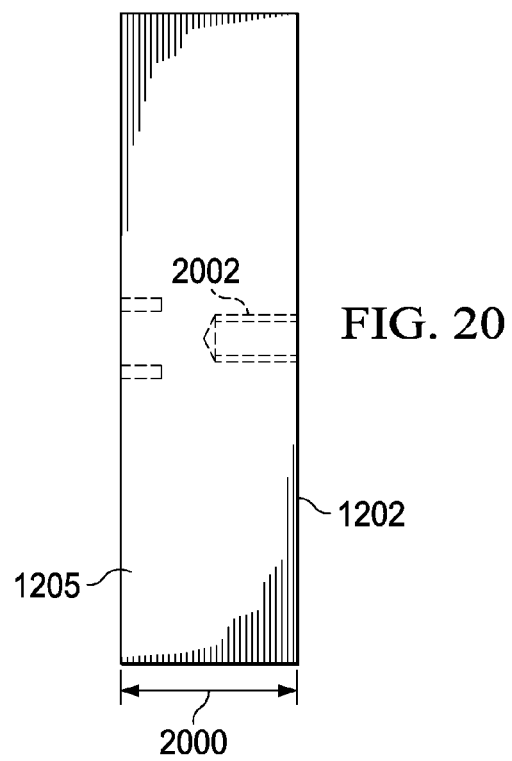
FIG. 20 is an illustration of a side view of a base structure in accordance with an advantageous embodiment.

Turning now to FIG. 20, an illustration of a side view of a base structure is depicted in accordance with an advantageous embodiment. In this illustrative example, base structure 1202 has thickness 2000. Thickness 2000 is about 2.50 inches in these illustrative examples. Base structure 1202 also may include channel 2002, which is shown in phantom within base structure 1202. Channel 2002 may be configured to receive load cell 1216 in FIG. 12.

Figure 21:
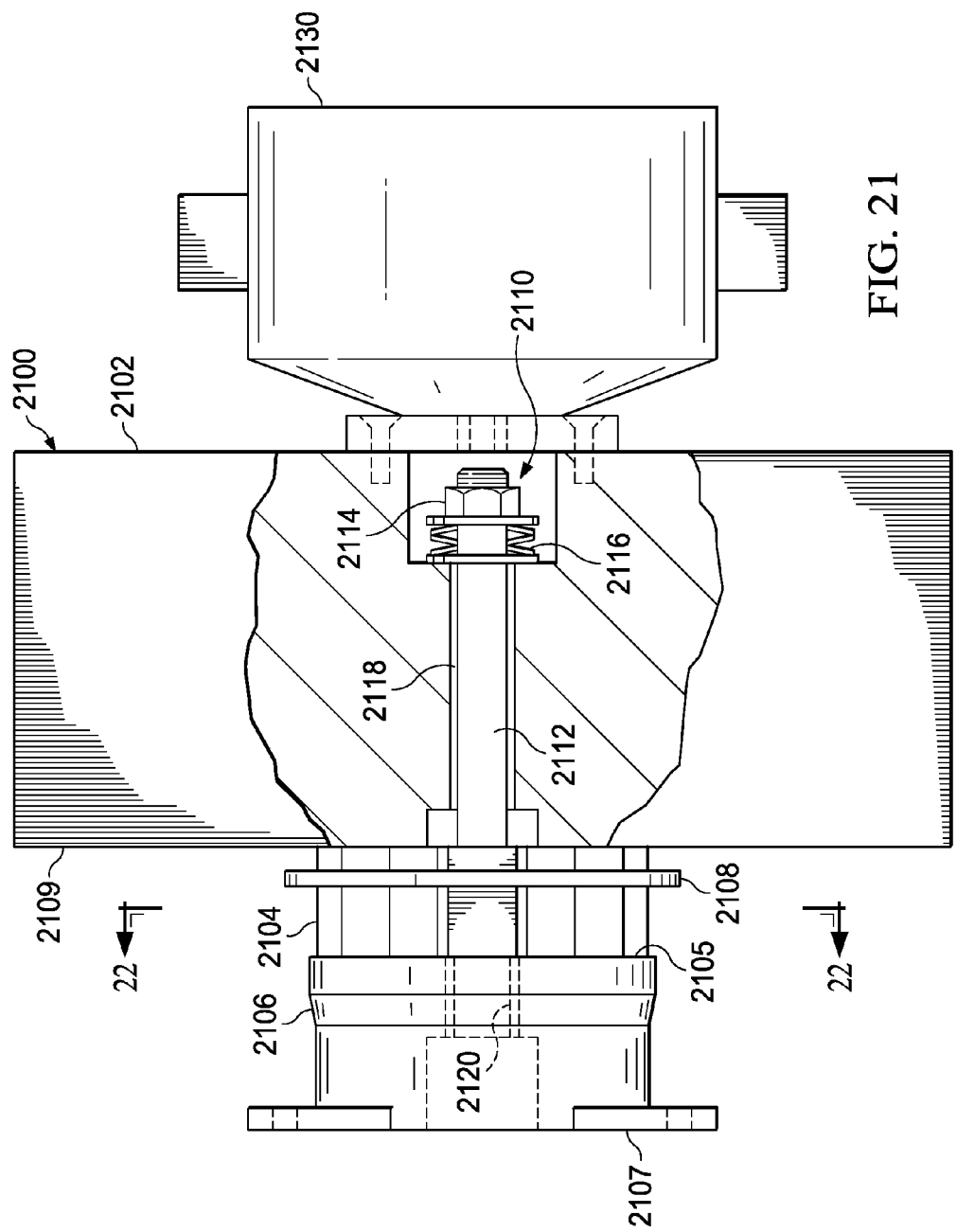
FIG. 21 is an illustration of a partially exposed view of a vibration unit in accordance with an advantageous embodiment.

Turning next to FIG. 21, an illustration of a partially exposed view of a vibration unit is depicted in accordance with an advantageous embodiment. In this illustrative example, vibration unit 2100 is yet another example of a physical implementation for vibration unit 112 shown in block form in FIG. 1. As depicted, vibration unit 2100 comprises base structure 2102, piezoelectric transducer array 2104, contact structure 2106, alignment structure 2108, and preload system 2110.

Surface 2105 of contact structure 2106 is in contact with piezoelectric transducer array 2104. Surface 2107 is configured to be in contact with an object for testing. Surface 2109 on base structure 2102 is in contact with piezoelectric transducer array 2104.

Preload system 2110 is configured to apply a preload on piezoelectric transducer array 2104 and includes tie rod 2112, nut 2114, and Belleville springs 2116 as depicted in this partially exposed view. Tie rod 2112 extends through channel 2118 in base structure 2102 and through piezoelectric transducer array 2104 to contact structure 2106.

End 2120 of tie rod 2112 is associated with contact structure 2106. Nut 2114 may be manipulated to cause a load to be placed upon piezoelectric transducer array 2104. When nut 2114 is tightened, Belleville springs 2116 may exert a force to cause the preload on piezoelectric transducer array 2104.

When a clamping system is used with vibration unit 2100, load cell 2130 may measure a load applied by the clamping system. This clamping system may be, for example, clamping system 1212 in FIG. 12.

Figure 22:
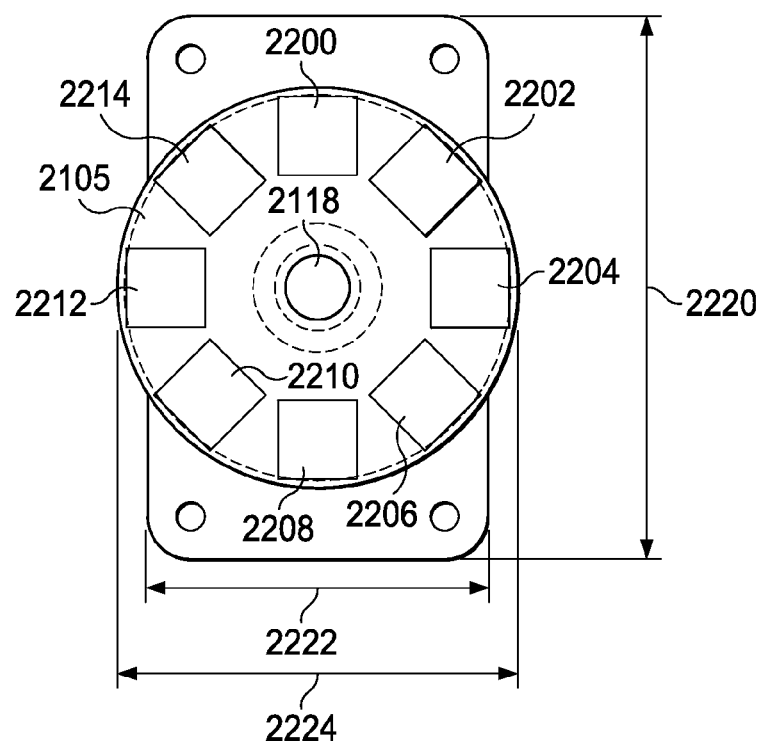
FIG. 22 is an illustration of a cross-sectional view of a vibration unit in accordance with an advantageous embodiment.

Turning now to FIG. 22, an illustration of a cross-sectional view of a vibration unit is depicted in accordance with an advantageous embodiment. In this illustrative example, piezoelectric transducer array 2104 and contact structure 2106 are shown in a cross-sectional view of vibration unit 2100 taken along lines 22-22 in FIG. 21.

In this view, surface 2105 of contact structure 2106 is shown. Piezoelectric transducers 2200, 2202, 2204, 2206, 2208, 2210, 2212, and 2214 are depicted in a circular arrangement in section 2216 of contact structure 2106. Channel 2118 is configured to receive a tie rod for a preload system.

In this illustrative example, contact structure 2106 has length 2220 and width 2222. Length 2220 is about 3.10 inches and width 2222 is about 1.75 inches in this illustrative example. Additionally, section 2216 has diameter 2224. In this illustrative example, diameter 2224 is about 2.20 inches.

Figure 23:
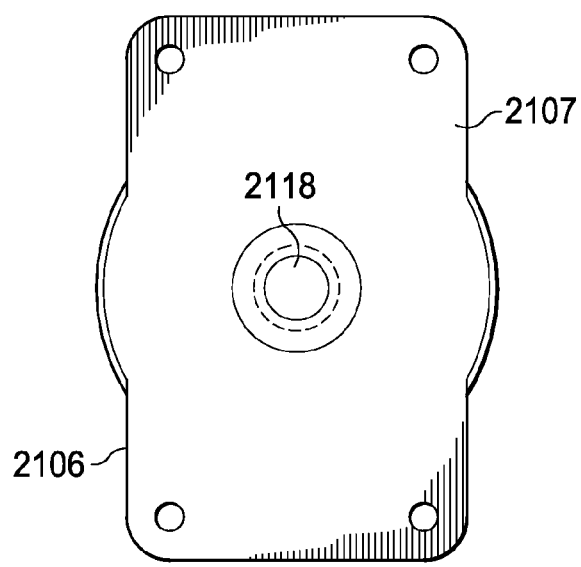
FIG. 23 is an illustration of a contact structure in accordance with an advantageous embodiment.

With reference next to FIG. 23, an illustration of a contact structure is depicted in accordance with an advantageous embodiment. In this view, surface 2107 on contact structure 2106 is shown. Surface 2107 is configured to contact an object for testing.

Figure 24:
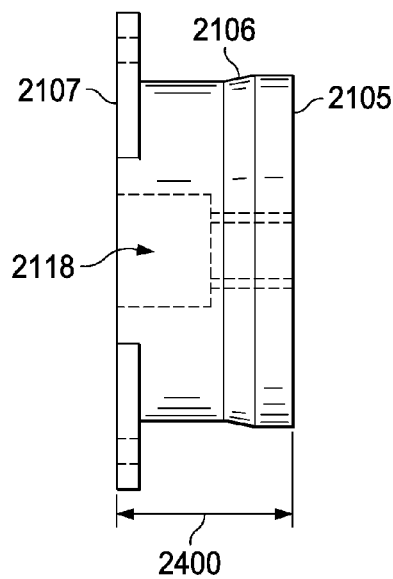
FIG. 24 is another illustration of a contact structure in accordance with an advantageous embodiment.

With reference to FIG. 24, another illustration of a contact structure is depicted in accordance with an advantageous embodiment. In this illustrative example, a side view of contact structure 2106 is illustrated. In this side view, contact structure 2106 has thickness 2400. Thickness 2400 is about 1.10 inches thick in this illustrative example.

Figure 25:
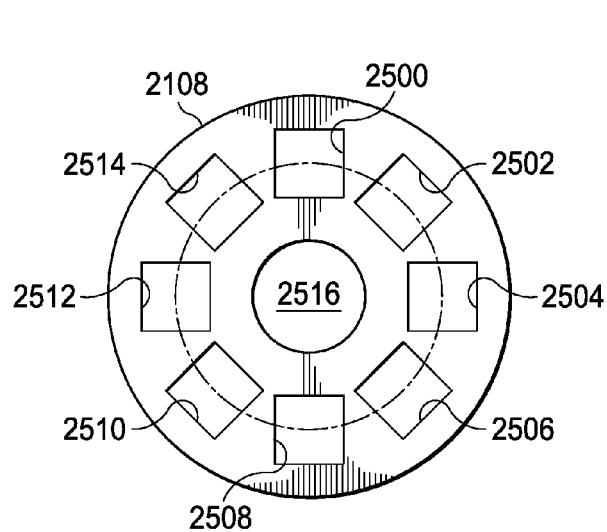
FIG. 25 is an illustration of an alignment structure in accordance with an advantageous embodiment.

Turning now to FIG. 25, an illustration of an alignment structure is depicted in accordance with an advantageous embodiment. In this illustrative example, alignment structure 2108 includes holes 2500, 2502, 2504, 2506, 2508, 2510, 2512, and 2514. These holes are configured to receive piezoelectric transducers in piezoelectric transducer array 2104.

Hole 2516 is configured to receive a portion of a biasing structure configured to provide a preload for piezoelectric transducer array 2104. In particular, hole 2516 is configured to receive end 2120 of tie rod 2112 in FIG. 21.

Figure 26:
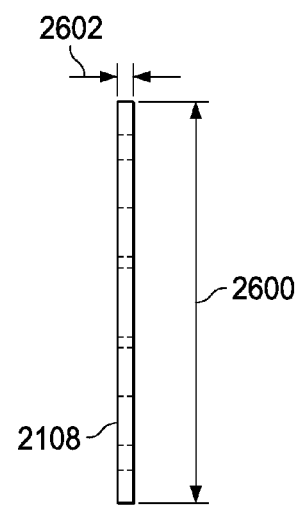
FIG. 26 is an illustration of a side view of an alignment structure in accordance with an advantageous embodiment.

Turning now to FIG. 26, an illustration of a side view of an alignment structure is depicted in accordance with an advantageous embodiment. In this illustrative example, alignment structure 2108 is shown. Alignment structure 2108 has diameter 2600 and thickness 2602. Diameter 2600 is about 2.50 inches in this illustrative example and thickness 2602 is about 0.093 inches.

Figure 27:
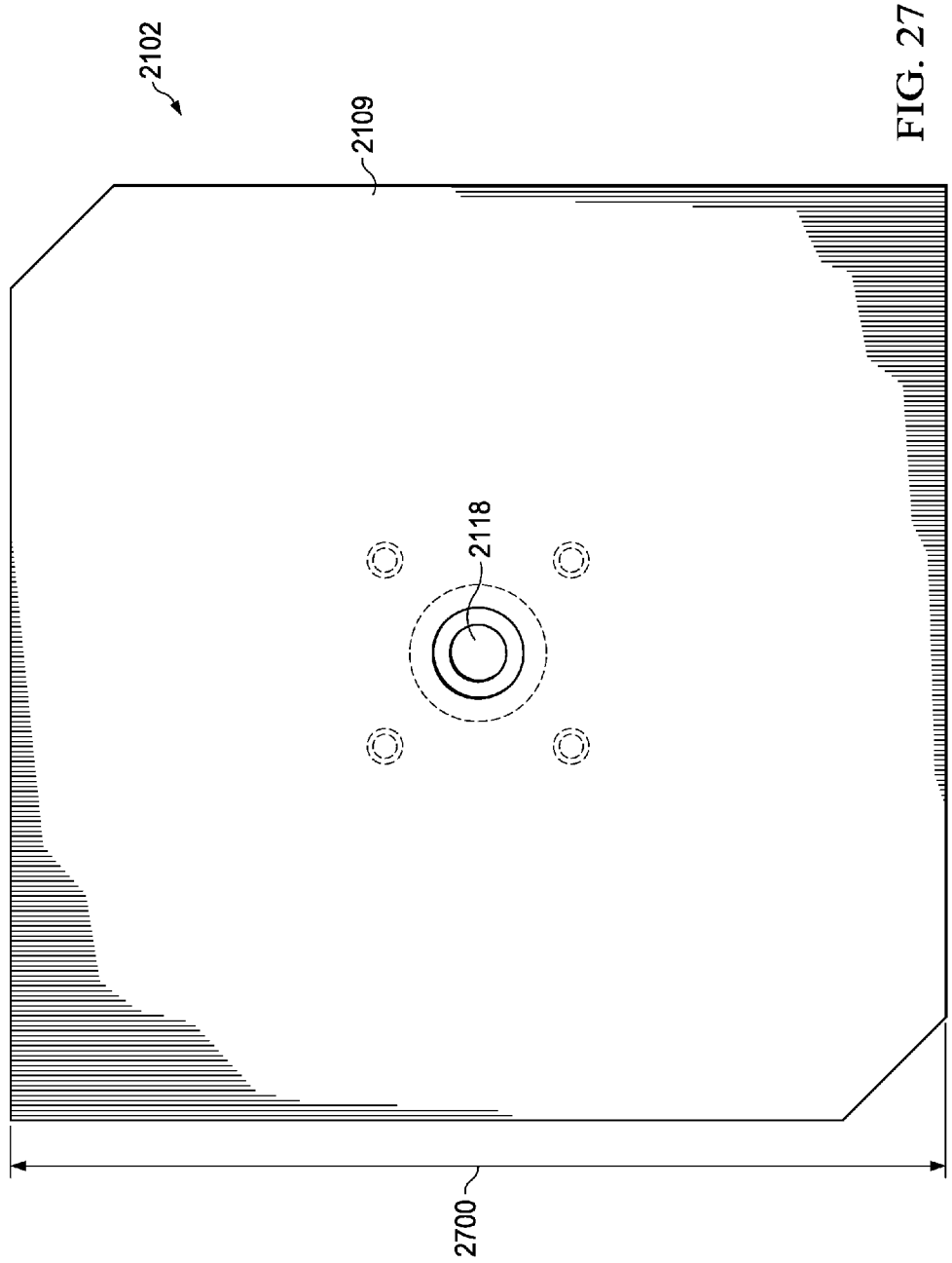
FIG. 27 is an illustration of a base structure in accordance with an advantageous embodiment.

Turning now to FIG. 27, an illustration of a base structure is depicted in accordance with an advantageous embodiment. In this view, surface 2109 on base structure 2102 is shown. Surface 2109 is configured to contact piezoelectric transducer array 2104.

In this illustrative example, base structure 2102 has length 2700 on each side. Length 2700 is about 9.00 inches in this illustrative example. Additionally, channel 2118 is shown in base structure 2102. Channel 2118 is configured to receive tie rod 2112 in FIG. 21.

Figure 28:
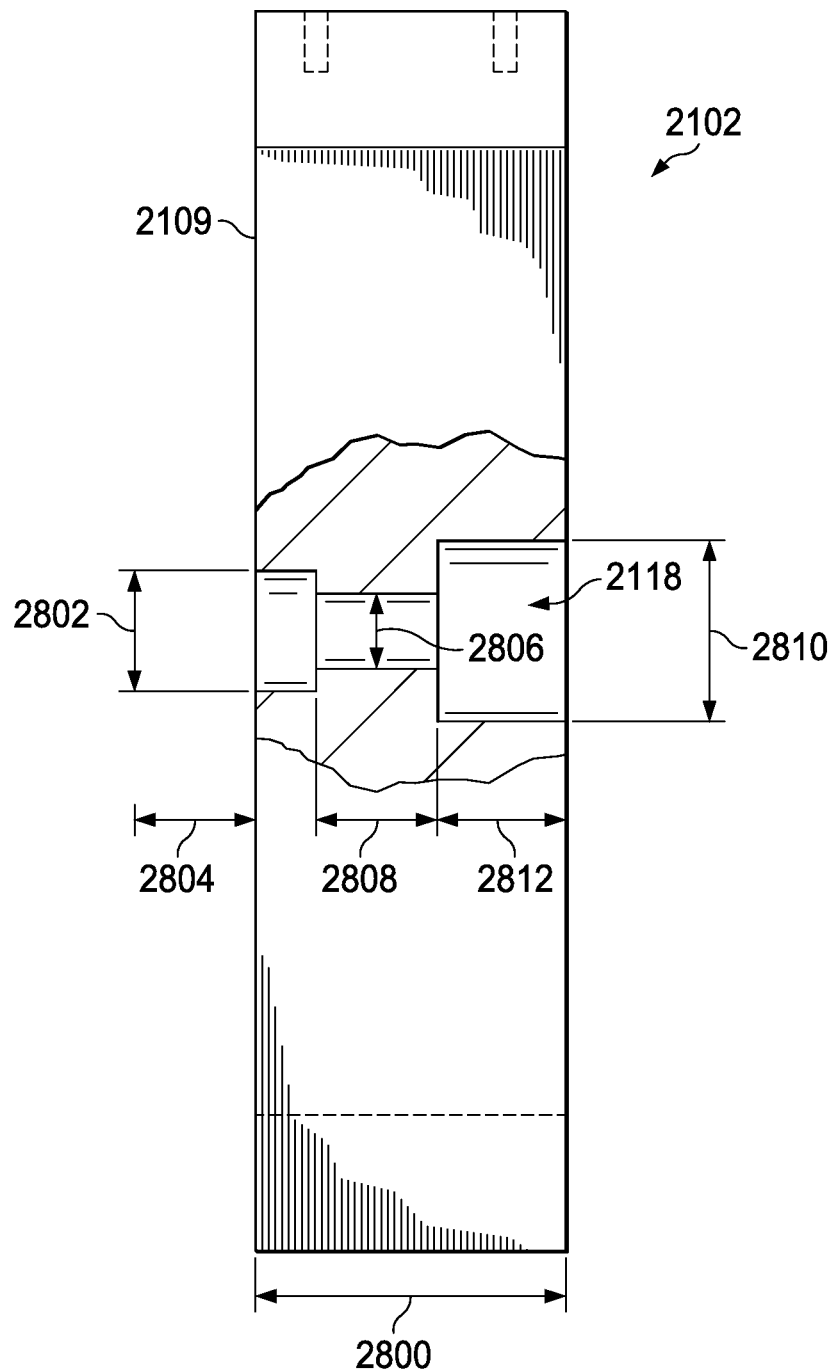
FIG. 28 is an illustration of a side view of a base structure in accordance with an advantageous embodiment.

Turning now to FIG. 28, an illustration of a side view of a base structure is depicted in accordance with an advantageous embodiment. In this illustrative example, base structure 2102 has thickness 2800. Thickness 2800 is about 2.50 inches.

As shown in this illustrative example, channel 2118 in base structure 2102 has diameter 2802 along length 2804. Channel 2118 has diameter 2806 along length 2808. Additionally, channel 2118 has diameter 2810 along length 2812. In these illustrative examples, diameter 2802 is about 0.78 inches and length 2804 is about 0.50 inches. Diameter 2806 is about 0.53 inches and length 2808 is about 1.00 inch. Diameter 2810 is about 1.50 inches and length 2812 is about 1.00 inch.

In FIGS. 2-28, the different components depicted may be combined with components shown in block form in FIG. 1, used with components in FIG. 1, or a combination of the two. Additionally, some of the components in FIGS. 2-28 may be illustrative examples of how components shown in block form in FIG. 1 may be implemented as physical structures.

Figure 29:
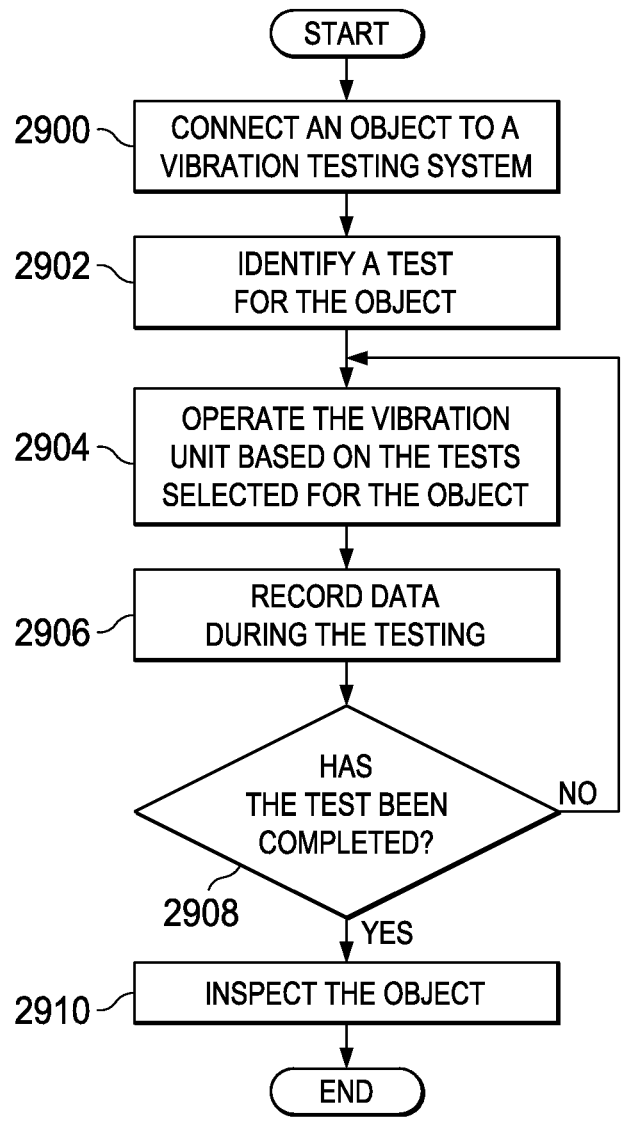
FIG. 29 is an illustration of a flowchart of a process for testing an object in accordance with an advantageous embodiment.

Turning now to FIG. 29, an illustration of a flowchart of a process for testing an object is depicted in accordance with an advantageous embodiment. The process illustrated in FIG. 29 may be implemented in object testing environment 100 using vibration testing system 104 in FIG. 1.

The process begins by connecting an object to a vibration testing system (operation 2900). In this example, the object under test is connected to a vibration unit, such as vibration unit 112 in FIG. 1. This connection may be made in a number of different ways. For example, the object under test may be placed on a contact structure for the vibration unit. In other illustrative examples, the object under test may be clamped to the contact structure for the vibration unit.

The process then identifies a test for the object (operation 2902). This test may identify frequencies, the amount of force, the amount of time, and other parameters for the test.

The process then operates the vibration unit based on the tests selected for the object (operation 2904). The process records data during the testing (operation 2906). A determination is made as to whether the test has been completed (operation 2908). If the process has not been completed, the process returns to operation 2904 as described above. Otherwise, the object is inspected (operation 2910) with the process terminating thereafter. The inspection may determine whether the object operates as desired after testing. Further, the inspection may include a determination as to whether any changes to the structure of the object have occurred.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, with one or more advantageous embodiments, more accurate vibration testing of objects may be performed. With vibration testing system 104, high-frequency vibration testing may be performed in a manner that may test objects in environments encountered by objects carried on a launch vehicle as precisely as desired. As a result, more robust and reliable hardware may be developed that is more likely to perform as desired. As a result, situations, such as launch failure, may be reduced. Also, with vibration testing system 104, savings may occur with a reduction of cycle time for developing hardware.

The description of the different advantageous embodiments has been presented for purposes of illustration and description, and is not intended to be exhaustive or limited to the embodiments in the form disclosed. Many modifications and variations will be apparent to those of ordinary skill in the art. For example, in one advantageous embodiment, a contact structure such as contact structure 204 may be unnecessary. Instead, piezoelectric transducer array 308 may directly contact the object under test.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a base structure;
   a contact structure;
   piezoelectric transducers configured to generate vibrations and located between the base structure and the contact structure, wherein a preload is present on the piezoelectric transducers; and
   a controller configured to control operation of the piezoelectric transducers,
   wherein the piezoelectric transducers generate vibrations with a desired number of frequencies and a desired force during the operation, and
   wherein the desired number of frequencies is a number of frequencies encountered during one of launch and reentry of a spacecraft.

2. The apparatus of claim 1 further comprising:
a preload system configured to apply the preload on the piezoelectric transducers.

3. The apparatus of claim 2, wherein the preload system is connected to the base structure and the contact structure and is configured to pull the base structure and the contact structure toward each other to apply the preload on the piezoelectric transducers.

4. The apparatus of claim 1, wherein the preload is selected to avoid separation between the contact structure and the piezoelectric transducers during an operation of the piezoelectric transducers.

5. The apparatus of claim 1 further comprising:
a power supply configured to send a direct current to the piezoelectric transducers.

6. The apparatus of claim 1 further comprising:
a clamping system configured to hold an object under test against the contact structure.

7. The apparatus of claim 1, wherein the piezoelectric transducers have a substantially even spacing.

8. The apparatus of claim 1, wherein the base structure has a first mass and the contact structure has a second mass, wherein the first mass is greater than the second mass.

9. The apparatus of claim 1 further comprising:
a resin located between the piezoelectric transducers and the contact structure.

10. The apparatus of claim 1, wherein the piezoelectric transducers are piezo stacks.

11. The apparatus of claim 1, wherein the desired number of frequencies is from about 10,000 Hz to about 100,000 Hz.

12. An apparatus comprising:
a base structure;
a contact structure;
a piezoelectric transducer array located between the base structure and an object and between the base structure and the contact structure; and
a biasing mechanism, wherein the biasing mechanism biases the contact structure and the base structure toward each other to apply a preload to the piezoelectric transducer array.

13. The apparatus of claim 12, wherein the contact structure is configured to contact the object.

14. A method for testing a structure, the method comprising:
placing an object in contact with a vibration unit, wherein the vibration unit comprises a base structure; a contact structure; and piezoelectric transducers located between the base structure and the contact structure, wherein a preload is present on the piezoelectric transducers; and
generating vibrations in the object using the vibration unit, wherein the piezoelectric transducers generate the vibrations,
wherein a controller controls operation of the piezoelectric transducers to generate the vibrations, wherein the piezoelectric transducers generate vibrations with a desired number of frequencies and a desired force during the operation, and wherein the desired number of frequencies is a number of frequencies encountered during one of launch and reentry of a spacecraft.

15. The method of claim 14, wherein the vibrations are from about 10,000 Hz to about 100,000 Hz.

16. The method of claim 14, wherein a preload system applies the preload on the piezoelectric transducers.

* * * * *